(12) United States Patent
Onodera et al.

(10) Patent No.: US 6,460,473 B1
(45) Date of Patent: Oct. 8, 2002

(54) SEEDLING-GROWING TAPE AND METHOD OF MANUFACTURING THE SAME

(75) Inventors: Tsuneo Onodera; Yoshiaki Watanabe, both of Sendai; Katsuhisa Ichikawa; Yasumi Fukuzumi, both of Wako; Shigetaka Isoyama, Kawagoe, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/701,555

(22) PCT Filed: Jun. 1, 1999

(86) PCT No.: PCT/JP99/02906

§ 371 (c)(1),
(2), (4) Date: Nov. 29, 2000

(87) PCT Pub. No.: WO99/62319

PCT Pub. Date: Dec. 9, 1999

(30) Foreign Application Priority Data

Jun. 1, 1998 (JP) ............................................. 10-151377
Mar. 26, 1999 (JP) ............................................. 11-083594

(51) Int. Cl.$^7$ ................................................. A01G 9/00
(52) U.S. Cl. ........................ 111/199; 111/200; 111/900; 29/891; 47/56; 47/58.1
(58) Field of Search ............................... 111/900, 919, 111/199, 200, 105; 47/1.01 R, 56, 58.1; 29/891

(56) References Cited

U.S. PATENT DOCUMENTS

| 3,385,242 | A | 5/1968 | Chancellor |
| 3,719,158 | A | 3/1973 | Roths |
| 4,167,910 | A | 9/1979 | Pretzer |

FOREIGN PATENT DOCUMENTS

| DE | 19504168 A1 | 8/1996 |
| EP | 0284877 A1 | 10/1988 |
| EP | 02104208 | 4/1990 |
| EP | 07289025 | 11/1995 |
| EP | 0823203 A1 | 2/1998 |
| EP | 0898867 A1 | 3/1999 |

*Primary Examiner*—Christopher J. Novosad
(74) *Attorney, Agent, or Firm*—Christensen O'Connor Johnson Kindness PLLC

(57) ABSTRACT

A seedling-growing sheet (1) is in the form of a laminate body (2) consisting of a band-like support member (3) and a porous sheet body (4) laminated on said support member (3). A large number of receptacles (6) for housing rice seeds (15) are formed in the sheet body (4) of the laminate body (2). These receptacles (6) are arranged apart from each other in the longitudinal direction of the support member (3). Formed in the laminate body (2) are cutting perforations (8) consisting of a large number of cut lines (9) along which planting pieces (10) each having at least one receptacle (6) are cut away from the laminate body (2). These cutting perforations (8) are arranged apart from each other in the longitudinal direction of the laminate body (2).

10 Claims, 22 Drawing Sheets

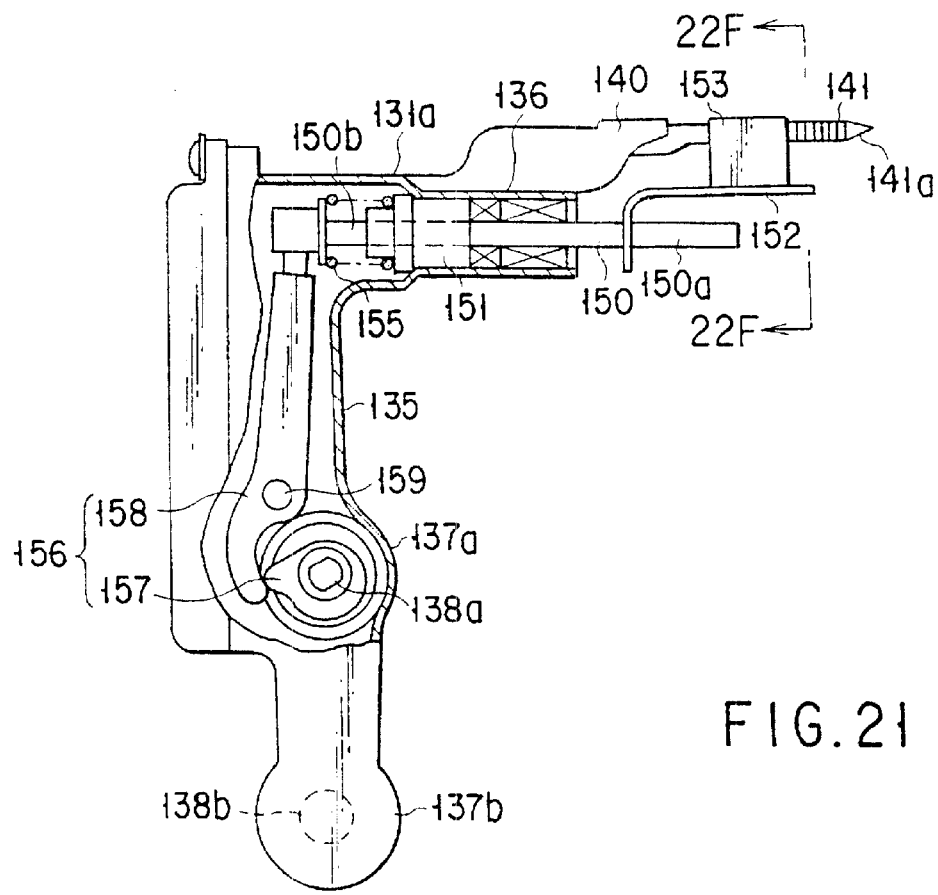
FIG. 21
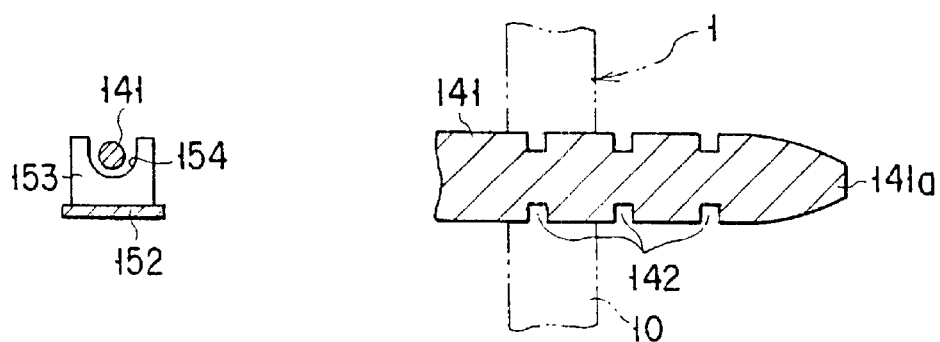
FIG. 22
FIG. 23

SEEDLING-GROWING TAPE AND METHOD OF MANUFACTURING THE SAME

TECHNICAL FIELD

The present invention relates to a seedling-growing sheet adapted for growing seedlings of, for example, paddy rice, a method of manufacturing the same, a planting device used in planting the seedling-growing sheet, and a planting machine equipped with said planting device.

BACKGROUND ART

A method of growing seedlings from rice seeds and planting the grown seedlings in a paddy field is disclosed in Japanese Patent Disclosure (Kokai) No. 50-57808. In this prior art, an assembly prepared by mutually bonding a large number of paper cylinders on a single plane is used for growing seedlings. Each paper cylinder is loaded with soil, and a rice seed is sown in the soil loaded in each paper cylinder so as to grow the seedlings of the paddy rice. After growth of the seedlings, the paper cylinders are individually separated from each other, and the separated paper cylinder housing the grown rice seedling is planted manually or by a planting machine in a paddy field.

In the prior art described above, however, a large area is required for growing the seedlings because a large number of paper cylinders are arranged side by side on a single plane. Naturally, it is laborious to handle the assembly of the paper cylinders. In addition, since soil is loaded in each paper cylinder, each paper cylinder is so heavy that it is highly laborious to transfer the assembly of the paper cylinders. Also, the soil tends to be scattered about in loading the soil in the paper cylinder so as to stain the working environment.

What should also be noted is that, when the paper cylinders housing the rice seedlings are planted in a paddy field by using a planting machine, it is necessary to regulate highly accurately the positional relationship between the planting machine and the paper cylinders, making it necessary to define strictly the relative positions of the paper cylinders arranged on a single plane. It follows that it is highly laborious to prepare the assembly of the paper cylinders so as to inhibit the mass production of the rice seedlings.

A first object of the present invention is to provide a seedling-growing sheet that permits growing seedlings without using soil so as to make the seedling-growing sheet small in size and light in weight and also permits easily mass production of seedlings.

A second object of the present invention is to provide a method of manufacturing a seedling-growing sheet of a laminate structure comprising receptacles of seeds and seedlings grown from the seeds and cutting perforations along which a planting piece including a receptacle is cut away from the seedling-growing sheet.

Further, a third object of the present invention is to provide a planting device that permits cutting away a planting piece from the seedling-growing sheet easily and without fail and also permits planting the planting pieces continuously in the field, and to provide a planting machine provided with the particular planting device.

DISCLOSURE OF INVENTION

The first object of the present invention can be achieved by a seedling-growing sheet, comprising:
- a laminate body including a band-like support member and a porous sheet body laminated on the support member;
- a large number of receptacles for housing seeds and seedlings grown from the seeds, the receptacles being formed in the sheet body of the laminate body and arranged apart from each other in the longitudinal direction of the support member; and
- cutting perforations consisting of a large number of cut lines, the cutting perforations extending across the width of the laminate body and arranged a predetermined distance apart from each other in the longitudinal direction of the laminate body to have a planting piece including at least one receptacle defined between two adjacent cutting perforations.

According to the seedling-growing sheet of the construction described above, the seedling is grown with the seed housed in the receptacle of the sheet body, making it unnecessary to use soil for growing the seedling. Therefore, the seedling can be grown under a clean environment. In addition, the seedling-growing sheet itself can be made small in size and light in weight so as to facilitate the handling such as transference of the seedling-growing sheet.

Also, since cutting perforations are formed in the seedling-growing sheet, the planting piece defined between adjacent cutting perforations can be cut away easily from the seedling-growing sheet along the cutting perforation. Naturally, it is possible to prevent the planting piece from being partially broken and to prevent a plurality of planting pieces from being cut away together when the planting pieces are planted in the field. It follows that the seedlings can be planted continuously in the field.

In addition, a large number of receptacles are formed a predetermined distance apart from each other in the longitudinal direction of the seedling-growing sheet, making it possible to grow a large number of seedlings in a single seedling-growing sheet. What should also be noted is that the seedling-growing sheet is in the form of a band, making it possible to wind the sheet to form a sheet roll in the step of growing the seedlings. In this case, it is possible to send out easily the seedling-growing sheet from the sheet roll in the longitudinal direction of the sheet so as to avoid troubles in the step of sending out the seedling-growing sheet.

The second object of the present invention can be achieved by a method of manufacturing a seedling-growing sheet, comprising:
- a first step of forming a large block consisting of a porous material;
- a second step of slicing the large block to form a band-like sheet body having an optional thickness;
- a third step of forming a laminate body by laminating the band-like sheet body on a band-like support member; and
- a fourth step of forming a large number of receptacles for housing seeds in the sheet body of the laminate body a predetermined distance apart from each other in the longitudinal direction of the laminate body and a large number of cutting perforations extending across the width of the laminate body and arranged a predetermined distance apart from each other in the longitudinal direction of the laminate body to have a planting piece including at least one receptacle defined between two adjacent cutting perforations.

The particular method of the present invention makes it possible to arrange the first to fourth manufacturing steps on a continuous single line to manufacture efficiently a laminate body having receptacles and cutting perforations.

The third object of the present invention can also be achieved by a planting device, comprising:

a sheet holding section for holding a seedling-growing sheet including a band-like body, a large number of receptacles for housing seeds, which are formed a predetermined distance apart from each other in the longitudinal direction of the band-like body, and a large number of cutting perforations extending across the width of the band-like body and arranged a predetermined distance apart from each other in the longitudinal direction of the band-like body to have a planting piece including at least one receptacle defined between two adjacent cutting perforations;

a transfer mechanism for sending out the seedling-growing sheet from the sheet holding section;

a planting mechanism equipped with a planting claw movable substantially in a vertical direction, the planting claw of the planting mechanism being engaged with a tip portion of the seedling-growing sheet sent out from the sheet holding section to permit the planting piece to be cut away from the seedling-growing sheet along the cutting perforation and to be planted in a field; and a sheet-fixing mechanism arranged contiguous to the engaging section between the seedling-growing sheet and the planting claw so as to fix the seedling-growing sheet when the planting piece is cut away by the planting claw from the seedling-growing sheet.

The third object of the present invention can also be achieved by a planting machine, comprising:

a running vehicle provided with wheels;

a sheet-holding section mounted to a rear portion of the running vehicle;

a seedling-growing sheet mounted to the sheet-holding section and including a band-like body, a large number of receptacles for housing seeds, which are formed a predetermined distance apart from each other in the longitudinal direction of the band-like body, and a large number of cutting perforations extending across the width of the band-like body and arranged a predetermined distance apart from each other in the longitudinal direction of the band-like body to have a planting piece including at least one receptacle defined between two adjacent cutting perforations;

a transfer mechanism for sending out the seedling-growing sheet from the sheet holding section;

a planting mechanism equipped with a planting claw movable substantially in a vertical direction, the planting claw of the planting mechanism being engaged with a tip portion of the seedling-growing sheet sent out from the sheet holding section to permit the planting piece to be cut away from the seedling-growing sheet along the cutting perforation and to be planted in a field; and a sheet-fixing mechanism arranged contiguous to the engaging section between the seedling-growing sheet and the planting claw so as to fix the seedling-growing sheet when the planting piece is cut away by the planting claw from the seedling-growing sheet.

In the planting machine of the particular construction, the seedling-growing sheet is sent out by the transfer mechanism from the sheet-holding section. When the planting claw of the planting mechanism is engaged with a tip portion of the seedling-growing sheet, the planting piece is cut away from the seedling-growing sheet along the cutting perforation. When the planting piece is cut away from the seedling-growing sheet, the remaining seedling-growing sheet is fixed by the sheet-fixing mechanism. As a result, the seedling-growing sheet is prevent from being bent when the planting piece is cut away from the sheet, making it possible to cut away the planting pieces one by one along the cutting perforations easily and without fail. It follows that the planting piece is prevented from being broken partially and a plurality of planting pieces are prevented from being cut away simultaneously. Naturally, the planting pieces can be planted in the field continuously, leading to an efficient seedling-planting operation.

The support member included in the seedling-growing sheet of the present invention is formed of, for example, a film of thermoplastic resins such as polyethylene, polypropylene, acrylic resin and polyurethane; a film of thermosetting resin such as polyester; and a cellulose sheet such as woven or unwoven fabric and a paper sheet.

It is desirable for the support member to be biodegradable because the planting piece including the support member is left buried in the field after the planting step of the planting piece. The support member, which is biodegradable, is naturally decomposed biologically within the field so as to prevent contamination of the soil.

The biodegradable support members include types (1) to (3) given below:

(1) Known biodegradable resin films including those using natural polymers based on polysaccharides such as starch, cellulose and chitin as base materials; those using as base materials mixtures prepared by adding biodegradable resins such as starch and decomposition-promoting additives to general purpose plastic materials such as polyethylene and polystyrene; and those using as base materials polylactic acid, polymalic acid and polycaprolactam;

(2) Woven and unwoven fabrics using natural fibers; and (3) A cellulose sheet such as Japanese paper and machine-made paper.

It is desirable to determine the thickness of the support member not to obstruct the seedling-growing and seedling-planting operations. In the case of using, for example, the biodegradable resin film of type (1) given above, the thickness of the resin film should be 0.05 to 0.15 mm, desirably about 0.12 mm.

In the case of using the unwoven fabric of type (2) given above, it is desirable to set the basis weight of the sheet at 20 to 80 g/m$^2$ and the thickness of the sheet at 0.15 to 0.8 mm, preferably 0.2 to 0.4 mm. Also, in the case of using a woven fabric of a natural fiber, it is desirable to apply processing to the woven fabric depending on the density of the natural fiber.

The porous sheet body included in the laminate body of the present invention includes, for example, a soft or semi-rigid polyurethane foam sheet and an unwoven fabric. The sheet body should be thick enough to house the entire seed, e.g., 3 mm to 10 mm, preferably about 3 mm to 5 mm.

It is desirable for the polyurethane foam sheet to be biodegradable like the support member in order to prevent the soil of the field from being contaminated. The polyurethane foam sheet can be made biodegradable by allowing the foam sheet to contain, for example, polysaccharide series waste materials of agricultural products such as starch represented by corn, wheat and potato, molasses (refined molasses), soybean cakes, and skins of oranges.

The term "seed" used herein includes the seed after germination.

BRIEF DESCRIPTION OF DRAWINGS

FIG. 21 is a cross sectional view showing the planting mechanism;

FIG. 22 is a cross sectional view along the line 22F—22F shown in FIG. 21;

FIG. 23 is a cross sectional view showing the planting claw;

BEST MODE OF CARRYING OUT BEST MODE CARRYING OUT THE INVENTION

A first embodiment of the present invention will now be described with reference to FIGS. 1 to 23.

Figure 1:
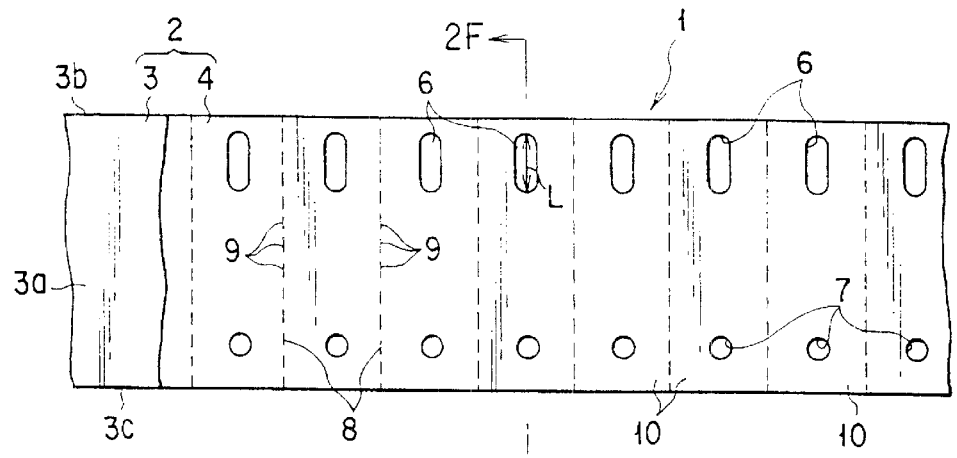
FIG. 1 is a plan view showing seedling-growing sheet according to a first embodiment of the present invention.
Figure 2:
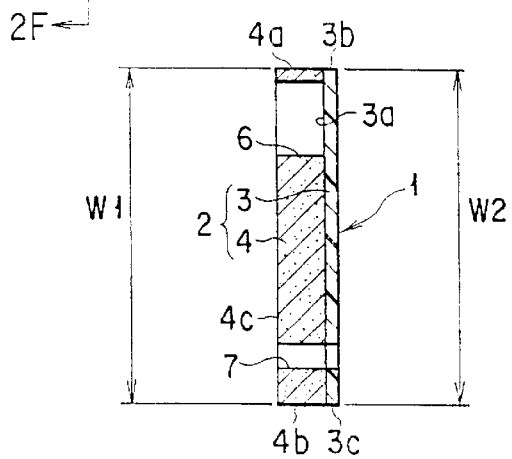
FIG. 2 is a cross sectional view along the line 2F—2F shown in FIG. 1.
Figure 3:
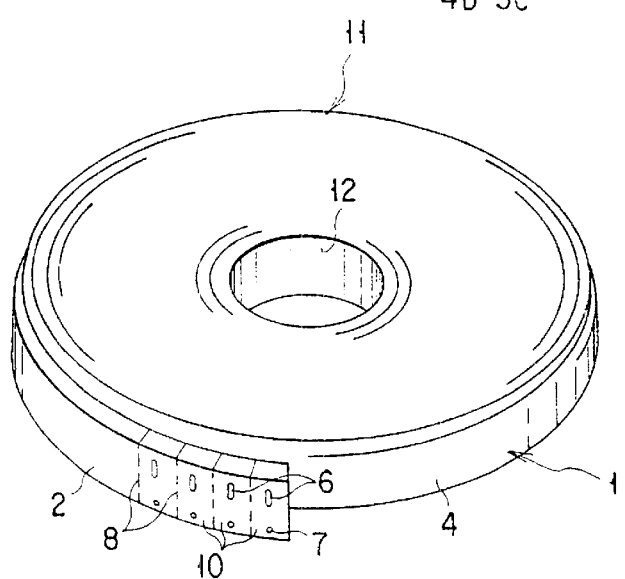
FIG. 3 is a perspective view showing a seedling-growing sheet wound into a roll.

First of all, FIGS. 1 to 3 collectively show a seedling-growing sheet 1. As shown in the drawings, the seedling-growing sheet 1 is formed of a band-like soft laminate body 2 consisting of a support member 3 and a porous sheet body 4. The support member 3 consists of a biodegradable film made of a natural polymer type material, i.e., polysaccharides such as starch, and has a thickness of 0.15 mm. A bonding plane 3a is formed over the entire surface of the support member 3. The support member 3 is arranged upright such that the bonding plane 3a is held upright. Therefore, the support member 3 has an upper edge 3b and a lower edge 3c vertically apart from each other. These upper and lower edges 3b and 3c define the width of the support member 3 and, thus, extend over the entire length of the support member 3.

The sheet body 4 is formed of a biodegradable soft, including semirigid, polyurethane foam containing a polysaccharide series waste material of agricultural products and has a thickness of 3 to 5 mm such that the entire seedling can be housed therein. The sheet body 4 is in the form of a band extending along the support member 3. Naturally, the sheet body 4 has an upper surface 4a and a lower surface 4b apart from each other in the width direction of the sheet body 4 and a side surface 4c continuous to the surfaces 4a and 4b. The upper surface 4a and lower surface 4b extending in parallel over the entire length of the sheet body 4.

As shown in FIG. 2, the sheet body 4 is bonded to the bonding plane 3a of the support member 3. A width W1 of the sheet body 4 is equal to a width W2 of the support member 3. Naturally, the upper and lower surfaces 4a, 4b of the sheet body 4 are contiguous with the upper and lower edges 3b and 3c of the support member 3, respectively.

The thickness of the support member 3 is markedly smaller than the thickness of the sheet body 4. However, in order to clearly show the construction of the laminate body 2, the thickness of the support member 3 is shown in a magnified fashion.

As shown in FIGS. 1 and 2, a large number of receptacles 6 are formed in an upper portion of the sheet body 4. Housed in the receptacle 6 is a seed or a seedling, e.g., a rice seed 15 (shown in FIG. 5A) of paddy rice. The receptacle 6 is formed of a recess open on the side opposite to the support member 3. A large number of receptacles 6 are equidistantly arranged to form a row extending in the longitudinal direction of the sheet body 4. Each of these receptacle 6 is in the form of an elliptical recess elongated in the width direction of the sheet body 4. The receptacle 6 has a length L substantially equal to or larger than the length of the rice seed 15.

A large number of engaging holes 7 having a circular cross section are formed in a lower portion of the laminate body 2 in a manner to extend through the support member 3 and the sheet body 4 forming the laminate body 2. These engaging holes 7 are equidistantly arranged to form a row extending in the longitudinal direction of the laminate body 2.

As shown in FIG. 1, a large number of cutting perforations 8 are formed in the laminate body 2. Each of these cutting perforations 8 consists of a plurality of slit-like cut lines 9 extending through the support member 3 and the sheet body 4, and these cutting perforations 8 serve to cut successively planting pieces 10 each including at least one receptacle 6 and one engaging hole 7. The cutting perforations 8, which are positioned in the centers of the adjacent receptacles 6 and the adjacent engaging holes 7 and constitute straight lines across the laminate body 2 in the width direction, are equidistantly arranged in the longitudinal direction of the laminate body 2.

The seedling-growing sheet 1 of the particular construction. is manufactured through first to fourth steps described below.

In the first step, prepared is a porous material having open cells, followed by forming the porous material into a large block. Then, in the second step, the large block is sliced to obtain the sheet body 4 having a thickness of 3 to 10 mm. In the third step, the sheet body 4 is bonded to the bonding plane 3a of the support member 3 so as to obtain the laminate body 2. Finally, in the fourth step, blanking is applied to the laminate body 2 so as to form a large number of receptacles 6 in the sheet body 4 of the laminate body 2 and a large number of engaging holes 7 and cutting perforations 8 both extending through the sheet body 4 and the support member 3.

Where, for example, a soft polyurethane foam is selected as the porous material having open cells, the foam can be prepared by stirring and foaming a mixture consisting of a polyol such as a polyether polyol or a polyester polyol; an organic isocyanate such as tolylene diisocyanate, or 4,4'-diphenylmethane diisocyanate; an amine catalyst such as triethylene diamine; a tin catalyst such as dibutyltin dilaurate; a foam stabilizer such as a silicone oil; and a foaming agent such as $H_2O$ or a solvent having a low melting point, followed by crosslinking the resultant foam so as to obtain a desired porous material having open cells. In preparing the porous material, it is possible to use, as desired, other additives such as a coloring matter, a filler and a fertilizer.

In order to obtain a biodegradable polyurethane foam, polysaccharide series waste materials of agricultural products are dissolved in an organic solvent, followed by adding a polyisocyanate to the resultant solution so as to carry out polymerization. Further, water, a foaming agent and a catalyst are added to the formed polymer so as to carry out reactions.

In preparing the soft polyurethane foam, it is desirable to use a polyether polyol as a polyol component in view of the mode of use of the seedling-growing sheet 1. To be more specific, a soft polyurethane foam prepared by using a polyester polyol as the polyol component contains a large proportion of closed cells, leading to a poor air permeability of the foam. In addition, the foam is inferior in hydrolyzing capability to the soft polyurethane foam prepared by using a polyether polyol as a polyol component.

Further, it suffices for the soft polyurethane foam to have a density of generally 14 to 35 $Kg/m^3$. If the density exceeds 35 $Kg/m^3$, the cell diameter is excessively small, with the result that the germination and growth are likely to be obstructed depending on the kind of the seedling to be grown. It follows that it is desirable for the soft polyurethane foam used for forming the sheet body 4 to have a density of 35 $Kg/m^3$ or less.

A soft polyurethane foam was actually prepared. Specifically, a mixture consisting of 100 parts by weight of a polyether polyol having a molecular weight of 3,000, three functional groups, and an OH value of 56, 0.01 part by weight of triethylene diamine (amine catalyst), 0.15 part by weight of n-ethyl morpholine, 0.12 part by weight of dibutyltin dilaurate (tin catalyst), 5.5 parts by weight of water, 1.2 parts by weight of a silicone oil (foam stabilizer), and 67 parts by weight of tolylene diisocyanate (2.4/2.6=80/20) was stirred and foamed so as to obtain a soft polyurethane foam. The resultant soft polyurethane foam was found to have a density of 18 $Kg/m^3$, a tensile strength of 1.1 $Kg/cm^2$, a tearing strength of 0.62 $Kg/cm^2$, and an elongation of 160%.

An unwoven fabric can be used as a porous material having open cells in place of the soft polyurethane foam. In the case of selecting an unwoven fabric, long fibers and short fibers such as polypropylene fibers and polyethylene fibers are continuously spun to permit these fibers to be entangled, followed by forming spun fibers into a sheet having a desired thickness.

A block of the porous material having open cells is sliced in the second step by a slicing machine to obtain the band-like sheet body 4 having a thickness of 3 to 10 mm. In the first embodiment, the block is sliced to prepare the sheet body 4 having a thickness of 4.5 mm.

In applying blanking to the laminate body 2 in the fourth step, two steps of a whole cut and a half cut are carried out continuously by using a blanking die. In the step of the whole cut, the laminate body 2 is arranged on the blanking die. In this step, the laminate body 2 is held horizontal such that the sheet body 4 faces upward to face a punch. Under this condition, the punch is moved down so as to punch the laminate body 2, thereby forming the engaging holes 7 and the cutting perforations 8.

In the succeeding half cut step, another punch is set in the blanking die, and the laminate body 4 is arranged on the blanking die. Under this condition, the punch is moved down. In this step, the downward movement of the punch is stopped immediately before the punch, which has punched the sheet body 4 alone, reaches the support member 3 of the laminate body 2 so as to form the receptacles 6 in the sheet body 4 and, thus, to finish preparation of the band-like seedling-growing sheet 1.

The seedling-growing sheet 1 thus prepared is wound up into a roll such that the sheet body 4 of the laminate body 2 faces outward, as shown in FIG. 3. In other words, the band-like seedling-growing sheet 1 is settled compact into a sheet roll 11 having a central through hole 12. Naturally, the through hole 12 extends in the width direction of the seedling-growing sheet 1.

Figure 5C:
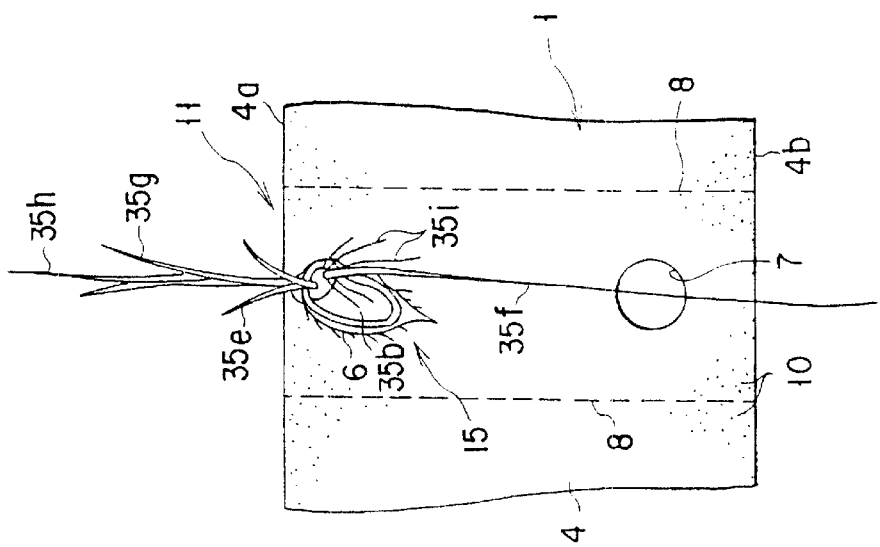
FIG. 5C schematically shows that a first leaf and a second leaf have grown from the rice seed.

The seedling-growing sheet 1 is used for the growing of seedlings by hydroponics. For growing, for example, seedlings of paddy rice, the rice seed 15 is housed in each of the receptacles 6 of the seedling-growing sheet 1, as shown in FIG. 5A. In the conventional method of growing seedlings of paddy rice, the rice seed 15 is dipped in water and, then, a germination stimulating treatment is applied to the seed, followed by sowing the rice seed 15. In the seedling-growing using the seedling-growing sheet 1 of the present invention, however, any of the germination stimulating treatment and the seed sowing can be performed first.

Where the seeds are sown first, followed by dipping the sown seeds in water, the seeds 15 are stored under a low temperature, e.g., about 15° C. or lower, followed by housing the seeds 15 in the receptacles 6 of the band-like seedling-growing sheet 1 that is stretched. Then, the seedling-growing sheet 1 is rolled into the sheet roll 11, and the sheet roll 11 is kept dipped in water for about 10 to 15 days at about 10° C.

Figure 4:
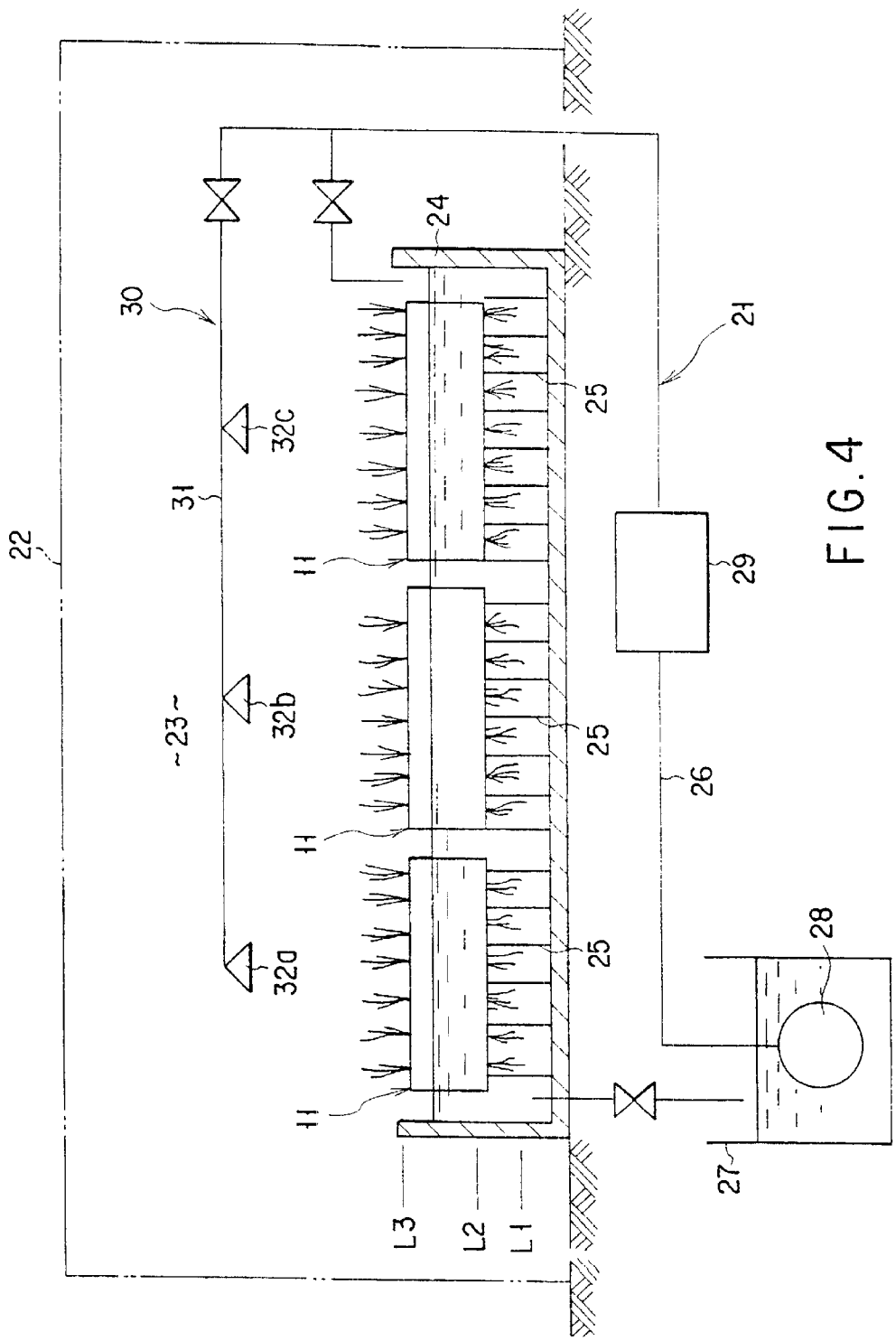
FIG. 4 is a cross sectional view showing a seedling-growing apparatus for applying a germination stimulating treatment to a seedling-growing sheet.

A seedling-growing device 21 shown in FIG. 4 is used for applying a germination stimulating treatment to the seeds 15 after the water-dipping treatment. The seedling-growing device 21 comprises a seedling-growing house 22 defining a seedling-growing chamber 23. A seedling-growing vessel 24 storing a solution for hydroponics is arranged within the seedling-growing chamber 23. A table 25 for horizontally supporting the sheet roll 11 is arranged in a lower portion of the seedling-growing vessel 24. It is desirable for the table 25 to be in the shape of a lattice having a large number of holes open on the upper surface.

As shown in FIG. 4, the seedling-growing vessel 24 communicates with a water tank 27 via a water circulating passageway 26. Mounted to the water circulating passageway 26 are a circulating pump 28 for forwarding again the solution for hydroponics, which is brought from the seedling-growing vessel 24 back into the water tank 27, into the seedling-growing vessel 24 and a heater 29 for heating the solution for hydroponics that is supplied into the seedling-growing vessel 24.

A shower device 30 is arranged in an upper portion of the seedling-growing chamber 23. The shower device 30 comprises a water pipe 31 branched from the water circulating passageway 26 and a plurality of spraying nozzles 32a, 32b, 32c mounted to the water pipe 31. As shown in the drawing, these spraying nozzles 32a, 32b, 32c are positioned right above the seedling-growing vessel 24. It follows that the solution for hydroponics that is heated by the heater 29 is partly supplied into the spraying nozzles 32a, 32b, 32c through the water pipe 31 so as to be sprayed toward the sheet roll 11 supported by the table 25.

In growing the seedling sprouted from the rice seed 15 by using the seedling-growing device 21, the rice seed 15 is held in the receptacle 6 of the seedling-growing sheet 1 such that an embryo 35a and an albumen 35b face upward and downward, respectively, as shown in FIG. 5A. Where the posture of the rice seed 15 is defined as above, the plumule 35c of the embryo 35a is positioned upward or sideward of the rice seed 15. Also, a radicle 35d is positioned downward or sideward of the rice seed 15. It follows that the germination rate is improved, and the seedlings are rendered uniform in height.

The solution for hydroponics is kept heated by the heater 29 at about 32 to 35° C. before sprouting of the rice seed 15. The warm solution for hydroponics is circulated between the seedling-growing vessel 24 and the water tank 27 through the water circulating passageway 26. During the circulation, the solution for hydroponics is sprayed every 5 to 8 hours onto the sheet roll 11. If the sheet roll 11 housed in the seedling-growing vessel 24 is immersed completely in the solution for hydroponics, the sprouting of the rice seed 15 is impaired by an oxygen shortage. To prevent the problem, the level of the solution for hydroponics within the seedling-growing vessel 24 is set at a level L1 shown in FIG. 4 so as to expose the sheet roll 11 to the air controlled at 30 to 32° C. within the seedling-growing chamber 23. Also, since light is not required before the sprouting, the seedling-growing house 22 is shielded from light.

Figure 5B:
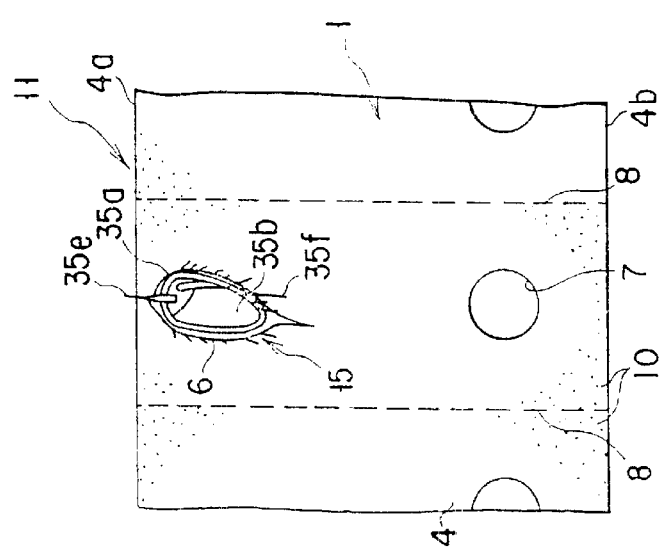
FIG. 5B schematically shows the state that a sheath leaf and a seminal root have grown from a rice seed.
Figure 5A:
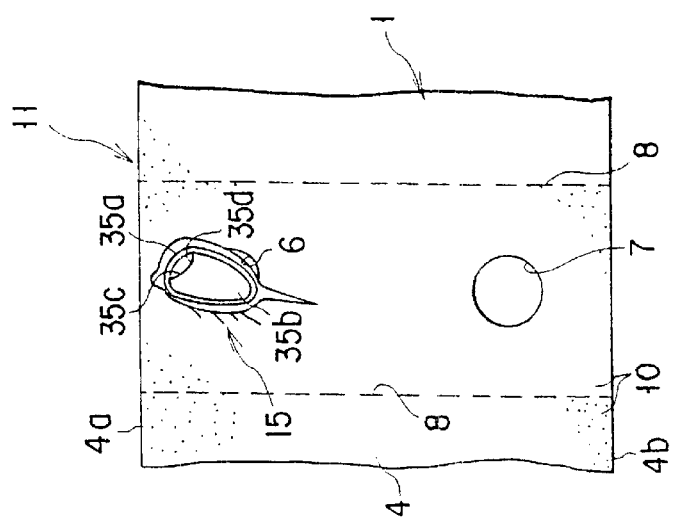
FIG. 5A schematically shows the state that a rice seed is housed in a receptacle of a seedling-growing sheet.

During the sprouting process of the rice seed 15 described above, a sheath leaf 35e grows upward from an upper portion of the rice seed 15 and, at the same time, a seminal root 35f grows from a lower portion of the rice seed 15, as shown in FIG. 5B.

After the sprouting, oxygen can be taken into the plant by the respiration of the leaf and, thus, the sheet roll 11 can be immersed in the solution for hydroponics. Therefore, the level of the solution for hydroponics is set at a level intermediate between a level L2 corresponding to the lower end of the sheet roll 11 and a level L3 corresponding to the upper end of the sheet roll 11, as shown in FIG. 4. Even if the level of the solution for hydroponics is lower than the level L3, the solution is sucked by the capillary action of the sheet body 4, making it possible to supply the solution to the rice seed 15. In this case, it is possible to actuate the shower device 30 so as to spray the solution for hydroponics from above the sheet roll 11 onto the sheet roll 11. It should also be noted that the light shielding means of the seedling-growing house 22 should be removed after the sprouting of the rice seed 15 because light is required for the growth of the seedling.

After germination of all the seeds 15 has been completed, temperature of the seedling-growing chamber 23 is gradually lowered to reach 20° C. at the end of the growth of the seedlings. At the same time, the humidity within the seedling-growing chamber 23 is gradually lowered, and the sheath leaf 35e is exposed to wind. By these temperature control and the humidity control, a useless unproductive growth of the seedling can be prevented so as to grow the seedling strong.

After germination of the rice seed 15, a first leaf 35g, a second leaf 35h and other leaves including a sixth leaf (not shown) are allowed to grow by the photosynthesis, etc., as shown in FIG. 5C. At the same time, the seminal root 35f grows further, and a coronal root 35i grows from the root of the seminal root 35f.

With progress in the growth of the seedling sprouted from the rice seed 15, the seminal root 35f also grows downward such that the tip of the seminal root 35f extends downward through the lower end 4b of the sheet body 4. In other words, the tip of the seminal root 35f is positioned below the sheet roll 11. It should be noted in this connection that the table 25 supporting the sheet roll 11 is in the shape of a lattice having a large number of holes positioned apart from each other, as described previously. It follows that the seminal roots 35f of the adjacent seeds 15 grow into the adjacent holes of the table 25. In other words, the seminal roots 35 of the adjacent seeds 15 are positioned apart from each other, with the result that these seminal roots 35f are prevented from being tangled with each other.

In growing the seedlings by hydroponics, it is desirable to control automatically the temperature, EC (electrical conductivity), pH (hydrogen ion concentration), etc. of the solution for hydroponics. Particularly, since the pH value tends to be varied easily during the seedling-growing process, it is desirable to keep the pH value controlled while circulating the solution for hydroponics.

After growth of the seedlings, the sheet roll 11 is pulled up from the table 25 one to three days before planting of the seedlings in a paddy field. As a result, a clearance is formed between the sheet roll 11 and the table 25. Under this condition, the seminal roots 35f growing downward below the sheet roll 11 are cut away by a cutter (not shown) running through the clearance.. One to three days after the cutting of the seminal roots 35f, thick main roots begin to grow from the seeds 15. It is desirable to conduct planting of the seedlings in a paddy field at the time when growth of the main roots has been recognized.

The dipping of the rice seed 15 in water is intended to supply water to the rice seed 15 and to dissolve in water the substances impairing the germination, which are contained in the husk of the rice seed 15. In order to remove efficiently the substances impairing the germination, it is necessary to control the dipping water at an appropriate temperature. It is also necessary to supply a sufficient oxygen to the rice seed 15. Further, it is appropriate to set the temperature of the dipping water at 30 to 32° C. before germination of the rice seed 15. If the temperature of the dipping water is controlled at this level, germination of the rice seed 15 is most promoted, and germination of all the seeds 15 is rendered uniform.

Where the temperature of the dipping water is lower than 30° C. before germination of the rice seed 15, the seedling grown from the rice seed 15 tends to take a disease, resulting in failure to grow the seedling strong. On the other hand, where the temperature of the dipping water is higher than 32° C. before germination of the rice seed 15, the respiration of the rice seed 15 is unduly promoted so as to consume the albumen 35b rapidly. It follows that the seedling grows to reach an abnormally large height and is rendered weak.

The seedling-growing sheet 1 and the seedling-growing device 21 of the present invention make it possible to prevent the water shortage and oxygen shortage that impair the growth of the seedling. Also, the germination inhibiting substances contained in the husk of the rice seed 15 is dissolved in the solution for hydroponics and, thus, is removed, with the result that a uniform germination is promoted.

Figure 6:
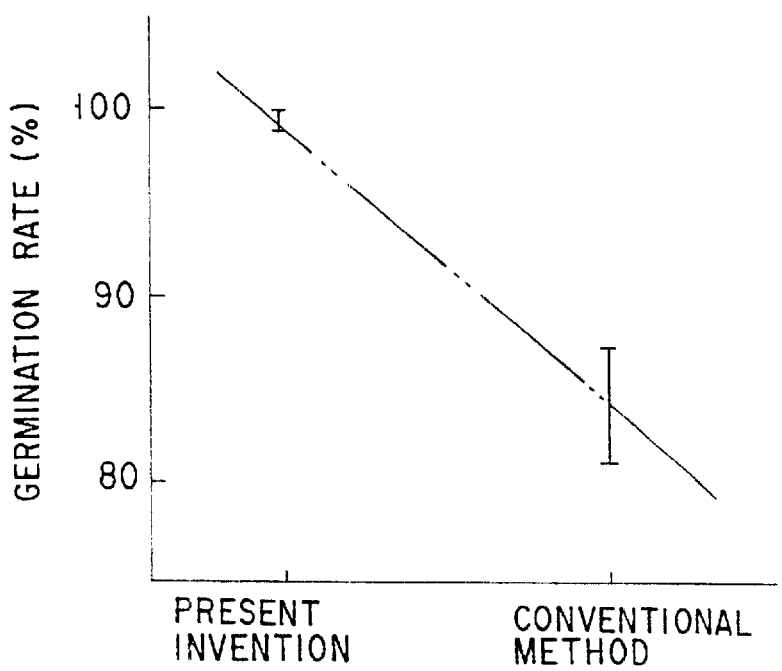
FIG. 6 is a graph showing the result of comparison in germination rate.

FIG. 6 is a graph showing the comparative data in the germination efficiency between the method of the present invention using the seedling-growing sheet 1 and the conventional method in which the seed is sown directly in the soil. As apparent from the experimental data, the method of the present invention using the seedling-growing sheet 1 is higher by 10% or more in the germination rate than the conventional method. The high germination rate leads to a uniform germination and to a satisfactory growth of the resultant seedling.

As described previously, the seedling-growing sheet 1 is rolled into the single sheet roll 11, and a large number of seeds 15 are held by the seedling-growing sheet 1 equidistantly apart from each other in the longitudinal direction of the seedling-growing sheet 1. The particular construction makes it possible for the sheet 1 to grow a large number of seedlings per unit area, with the result that the space required for growing the seedlings can be diminished.

Figure 7:
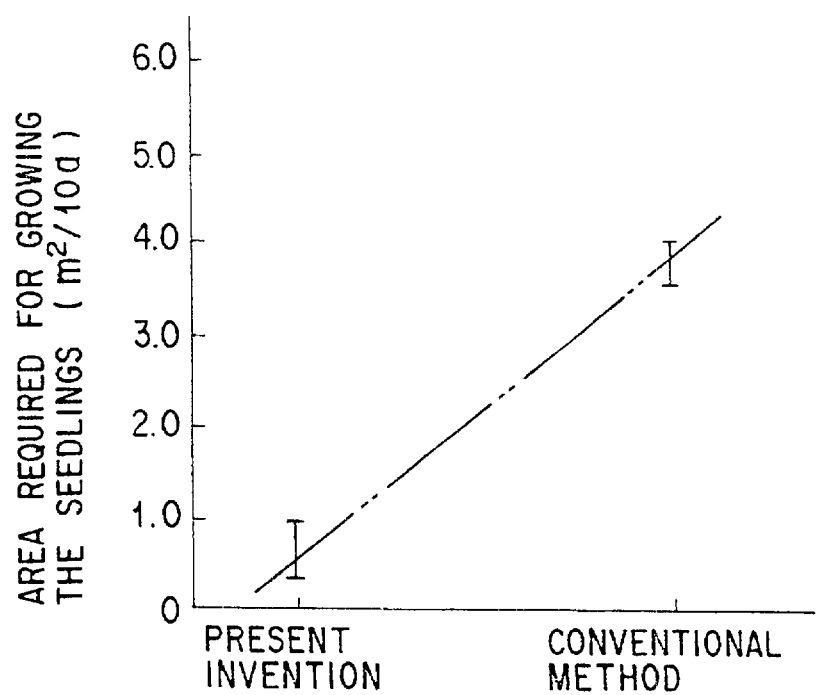
FIG. 7 is a graph showing the result of comparison in a seedling-growing area.

FIG. 7 is a graph showing the comparative data in the area required for growing the same number of seedlings between the method using the seedling-growing sheet 1 of the present invention and the conventional method in which seeds are sown directly in the soil for growing seedlings. As apparent from the graph, the seedling-growing sheet 1 of the present invention makes it possible to markedly diminish the area required for growing the seedlings.

A planting machine 40 for planting the seedlings grown by using the seedling-growing sheet 1 in a paddy field Z will now be described with reference to FIGS. 8 to 23.

Figure 8:
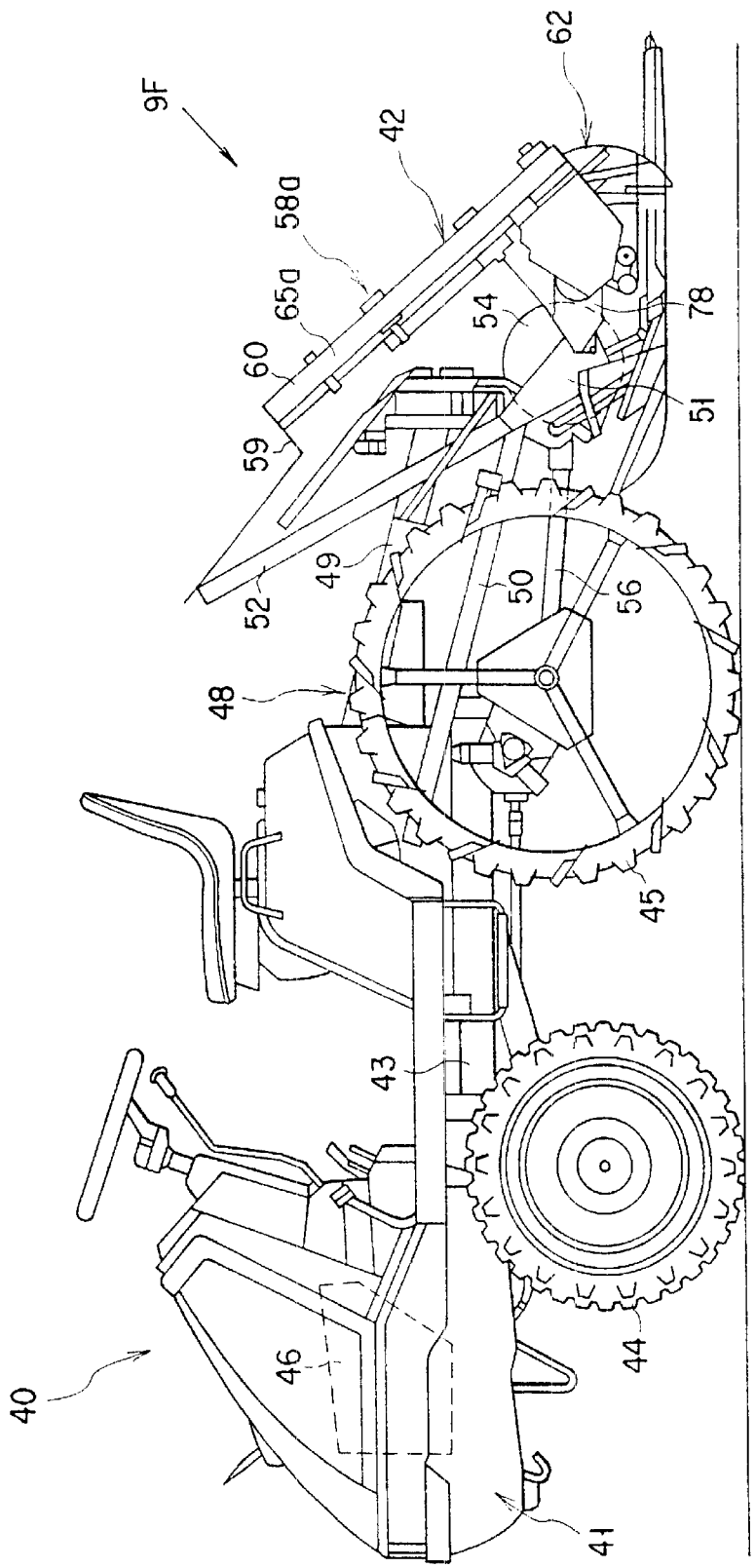
FIG. 8 is a side view showing a riding type planting machine.

Specifically, FIG. 8 shows a riding type planting machine 40 comprising a running vehicle 41 and a planting device 42 mounted in a rear portion of the running vehicle 41. The running vehicle 41 comprises a body frame 43. A pair of front wheels 44 and a pair of rear wheels 45 are supported by the body frame 43. Further, an engine 46 for driving the front wheels 44 and the rear wheels 45 are mounted in a front portion of the body frame 43.

A lifter mechanism 48 including an upper link 49, a lower link 50 and a bracket 51 is arranged in a rear portion of the body frame 43. Each of the upper link 49 and the lower link 50 is swingably supported in a rear portion of the body frame 43 and is moved in a vertical direction by a hydraulic cylinder (not shown). These links 49 and 50 extend through the clearance between the paired rear wheels 45 to positions rearward of the body frame 43. The rear end portions of the links 49 and 50 are joined to the bracket 51. A stay 52 extending upward and inclined forward is included in the bracket 51.

A transmission device 54 is supported by the bracket 51 of the lifter mechanism 48. An output shaft 55 (see FIG. 12) extending horizontal in the width direction of the body frame 43 is included in the transmission device 54. The output shaft 55 is joined to the engine 46 via a PTO (power take off) shaft 56, with the result that the power generated from the engine 46 is transmitted to the output shaft 55 of the transmission device 54 so as to rotate the output shaft 55.

Figure 9:
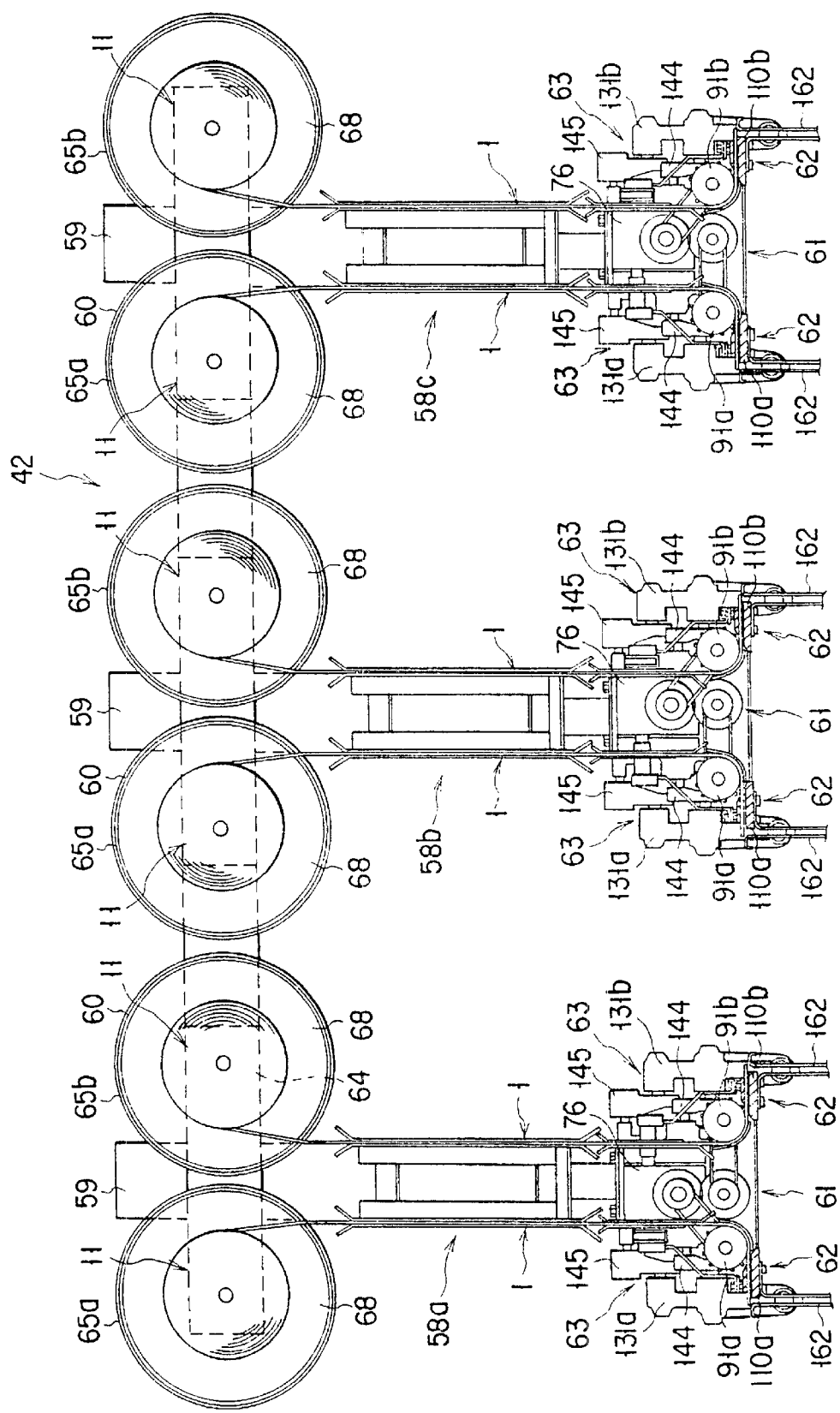
FIG. 9 is a plan view showing a planting device as seen in a direction 9F shown in FIG. 8.

As shown in FIG. 9, the planting device 42 comprises first to third planting units 58a, 58b, 58c each capable of planting two columns of seedlings. These planting units 58a, 58b, 58c are arranged to form a row in the width direction of the running vehicle 41. It follows that the planting device 42 is capable of planting six columns of seedlings simultaneously.

The first to third planting units 58a, 58b, 58c are equal to each other in construction. Therefore, the first planting unit 58a will be described in the following as a representative.

Figure 10:
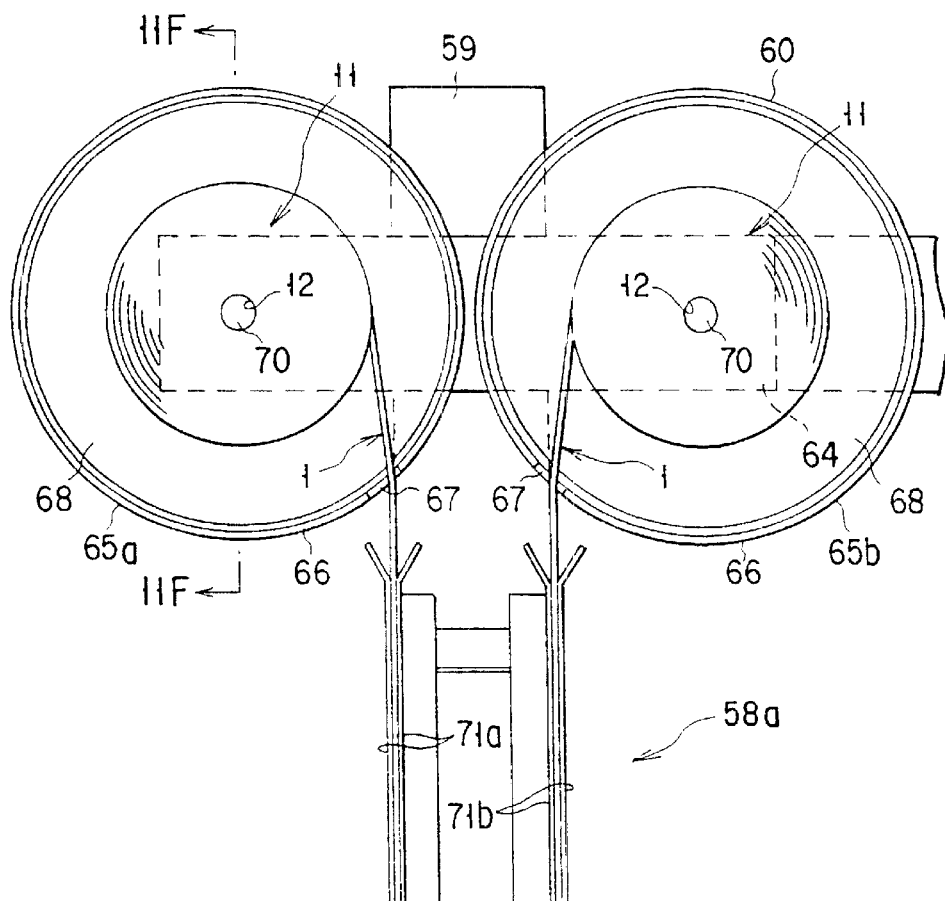
FIG. 10 is a plan view showing a first planting unit.
Figure 10:
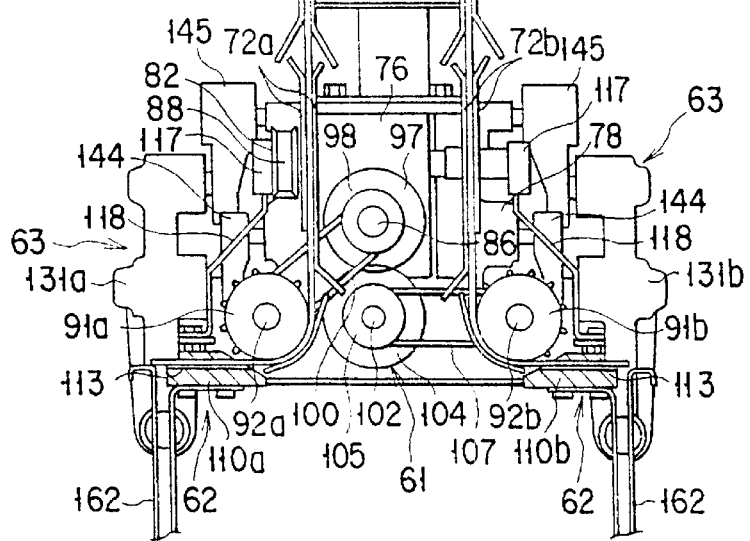

As shown in FIG. 10, the first planting unit 58a comprises a frame 59, a sheet holding section 60, a sheet transfer mechanism 61, a pair of sheet fixing mechanisms 62 and a pair of planting mechanisms 63.

The frame 59 is supported by the bracket 51 and the stay 52 of the lifter mechanism 48 and inclined forward along the stay 52 while extending upward. A table bracket 64 is fixed to an upper portion of the frame 59 and extends in the width direction of the running vehicle 41.

Figure 11:
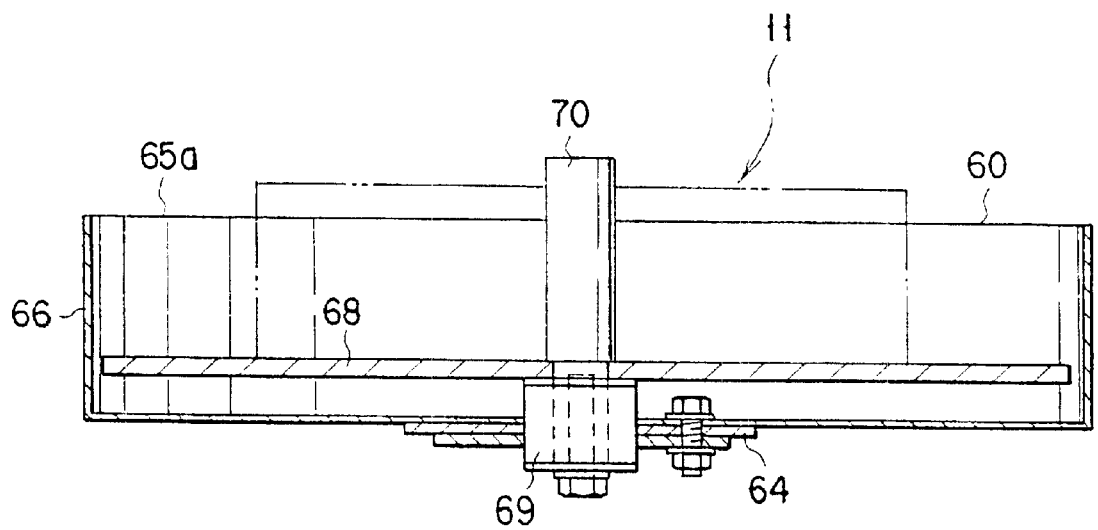
FIG. 11 is a cross sectional view along the line 11F—11F shown in FIG. 10.

As shown in FIGS. 10 and 11, the sheet holding section 60 is provided with a pair of housing boxes 65a, 65 that are supported by both end portions of the table bracket 64. Each of these housing boxes 65a, 65b has a cylindrical circumferential wall 66, and the sheet roll 11 is housed inside the circumferential wall 66. The circumferential wall 66 has an open portion 67 for passing the seedling-growing sheet 1 withdrawn in a tangential direction from the sheet roll 11.

A turn table 68, which is arranged within each of the housing boxes 65a, 65b, is rotatably supported by the table bracket.64 via a holder 69. The sheet roll 11 is arranged on the turn table 68. A supporting shaft 70, which is arranged in a central portion of the turn table 68, is fitted into the through-hole 12 of the sheet roll 11.

As shown most clearly in FIG. 8, the housing boxes 65a, 65b are arranged in substantially the same height as the body frame 43 in a rear portion of the body frame 43. Since these housing boxes 65a, 65b are arranged in a low position, the sheet roll 11 can be supplied easily into the housing boxes 65a, 65b.

As shown in FIG. 10, the seedling-growing sheets 1 withdrawn through the open portions 67 of the housing boxes 65a, 65b are guided in parallel along the upper surface of the frame 59.

A plurality of guide members 71a, 71b, 72a, 72b for guiding the withdrawing direction of the seedling-growing sheet 1 are arranged on an upper surface of the frame 59.

Figure 12:
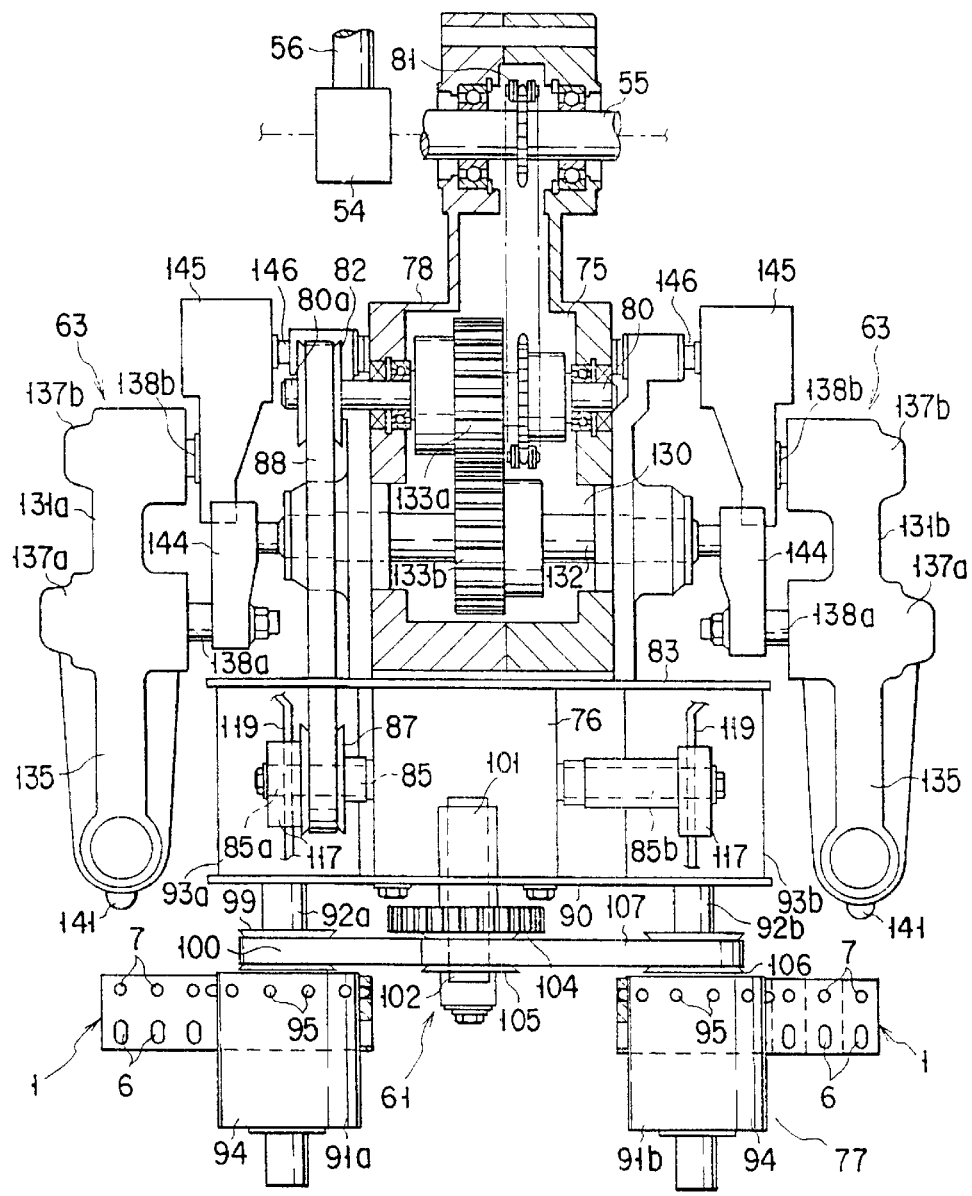
FIG. 12 is a cross sectional view showing a power transmitting system included in the first planting unit.
Figure 13:
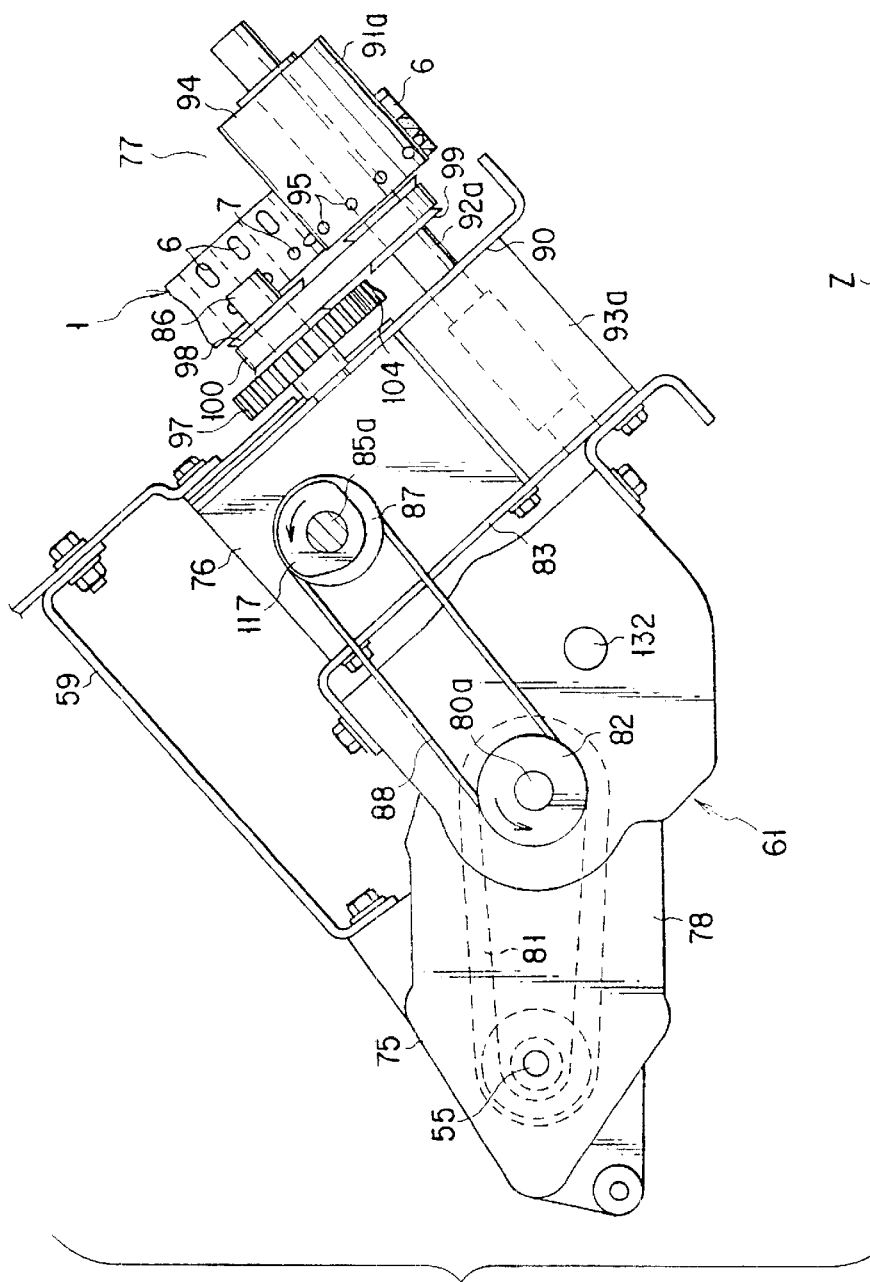
FIG. 13 is a side view showing a power transmitting system included in the first planting unit.
Figure 14:
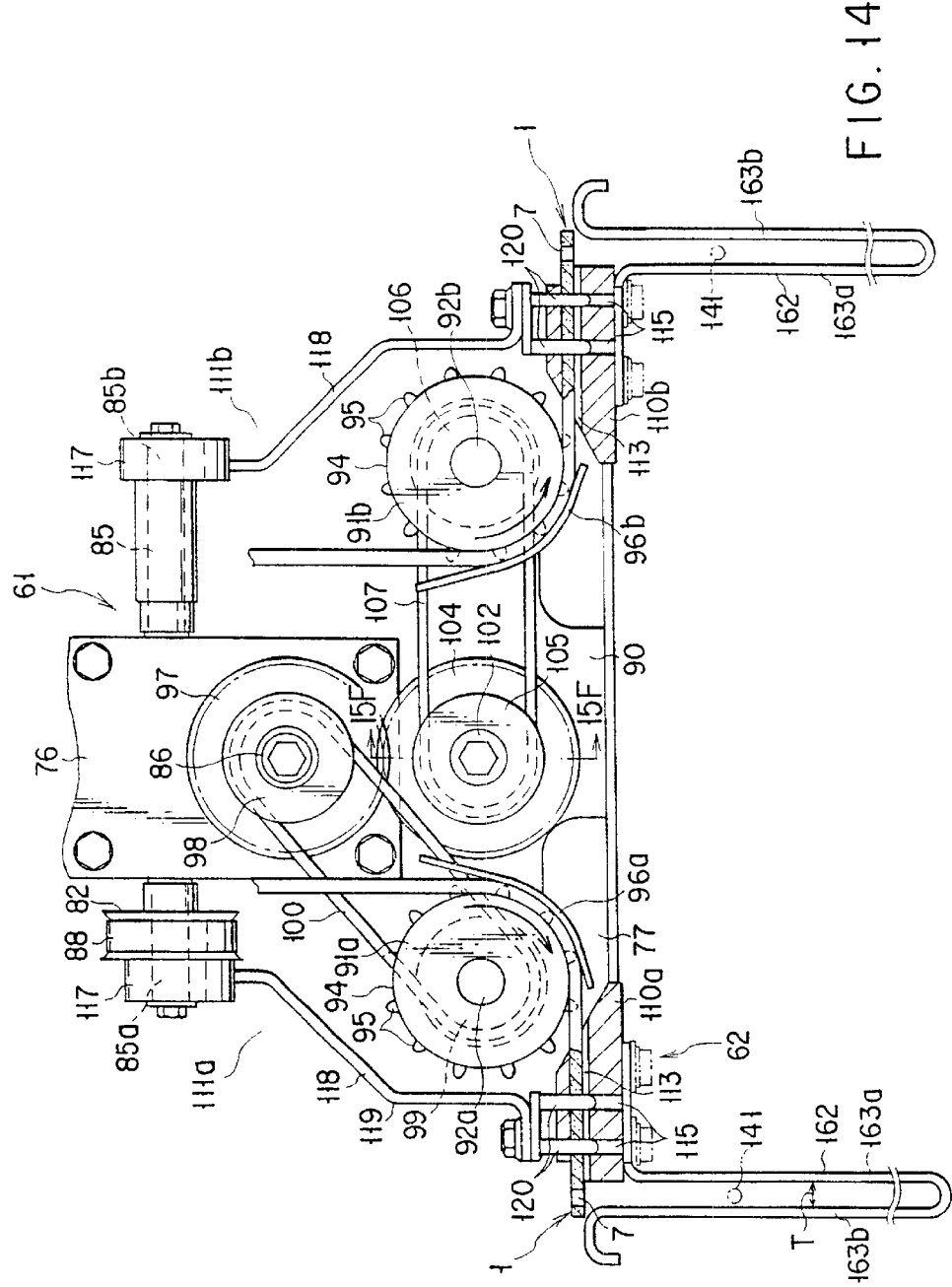
FIG. 14 is a plan view of the first planting unit showing in a partly broken manner the positional relationship between a transfer mechanism and a sheet fixing mechanism.

As shown in FIGS. 12 to 14, the sheet transfer mechanism 61 comprises a power input section 75, a gear box 76 and a sheet transfer section 77. The power input section 75 includes a drive case 78 that is supported by the bracket 51 of the lifter mechanism 48 and a lower end portion of the frame 59. As shown in FIG. 12, the output shaft 55 of the transmission device 54 is introduced into a front end portion of the drive case 78.

An intermediate shaft 80, which is rotatably supported within the drive case 78, is arranged in parallel to the output shaft 55 in a rear portion of the output:shaft 55. These output shaft 55 and intermediate shaft 80 are interlocked each other via a chain 81. Thus, the output shaft 55 and the intermediate shaft 80 are rotated in a counterclockwise direction in the drawing of FIG. 13. The intermediate shaft 80 includes one end portion 80a projecting sideward of the drive case 78. A primary pulley 82 is fixed to the end portion 80a.

As shown in FIGS. 12 and 13, the gear box 76, which has an input shaft 85 and an output shaft 86, is fixed to a rear end portion of the drive case 78 via a first base plate 83. The input shaft 85, which has first and second end portions 85a and 85b projecting outward of the gear box 76, is arranged in parallel to the intermediate shaft 80.

A secondary pulley 87 is fixed to the first end portion 85a of the input shaft 85. The secondary pulley 87 is interlocked with the primary pulley 82 via a first timing belt 88, with the result that the input shaft 85 of the gear box 76 is driven by the power transmitted from the intermediate shaft 80 so as to be rotated in the counterclockwise direction in the drawing of FIG. 13.

The gear box 76 converts the continuous rotation of the input shaft 85 into an intermittent rotation, with the result that the output shaft 86 is rotated intermittently. It should be noted that, if the input shaft 85 makes a ⅓ complete rotation (0 to 120°), the output shaft 86 is caused to make a ¹⁄₁₂ complete rotation (0 to 30°). Then, if the input shaft 85 makes a ⅔ complete rotation (0 to 240°), the output shaft 86 is caused to stop its rotation. In other words, the input shaft 85 is rotated continuously; whereas, the output shaft 86 makes an intermittent rotation at an interval of 30° in such a manner as: stop→rotation by 30°→stop→rotation by 30°.

As shown in FIG. 13, the output shaft 86 protrudes rearward from the gear box 76 in a lower end portion of the frame 59. The output shaft 86 is inclined upward toward the rear end. In other words, the output shaft 86 extends in a direction perpendicular to the withdrawing direction of the seedling-growing sheet 1.

As shown in FIGS. 12 to 14, a second base plate 90 is fixed to the gear box 76. The second base plate 90, which faces the first base plate 83 with the gear box 76 interposed therebetween, is joined to a lower end portion of the frame 59.

The sheet transfer section 77 is provided with first and second cylindrical transfer sprockets 91a, 91b. These transfer sprockets 91a, 91b are supported by driven cases 93a, 93b via rotary shafts 92a, 92b, respectively. These driven cases 93a, 93b are held between the first and second base plates 83, 90.

The first and second sprockets 91a, 91b are arranged apart from each other in the width direction of the running vehicle 41 below the frame 59. The seedling-growing sheet 1 is wound about an outer circumferential surface 94 of each of the first and second transfer sprockets 91a, 91b. Thus, a large number of projections 95 that are engaged with the engaging holes 7 of the seedling-growing sheet 1 are formed on the outer circumferential surface 94 apart from each other in the circumferential direction.

The seedling-growing sheets 1 withdrawn from the housing boxes 65a, 65b are guided by guide members 71a, 71b, 72a, 72b so as to be wound about the outer circumferential surfaces 94 of the first and second transfer sprockets 91a, 91b. Therefore, the forwarding direction of the seedling-growing sheet 1 is bent substantially at right angles in a lower end portion of the first planting unit 58a.

The seedling-growing sheets 1 withdrawn from the housing boxes 65a, 65b are guided so as to be brought into contact with the outer circumferential surfaces 94 of the first and second transfer sprockets 91a, 91b, respectively, such that these sheets 1 are positioned inside these transfer sprockets 91a, 91b. Then, each of these sheets 1 is guided along a portion of each of the outer circumferential surfaces 94 and, then, moved away from each of the transfer sprockets 91a, 91b. It follows that, as apparent from FIGS. 10 and 14, the seedling-growing sheets 1 are moved outwards from the transfer sprockets 91a, 91b in the width direction of the running vehicle 41. Needless to say, the moving directions in this stage of the two seedling-growing sheets 1 are opposite to each other.

As shown in FIG. 14, the sheet transfer section 77 is provided with a pair of sheet guides 96a, 96b arranged to extend along portions of the outer circumferential surfaces 94 of the first and second transfer sprockets 91a, 91b. The seedling-growing sheets 1 are guided into the clearances between the sheet guides 96a, 96b and the transfer sprockets 91a, 91b, respectively. When moving through these clearances, the seedling-growing sheets 1 are pressed by the sheet guides 96a, 96b against the outer circumferential surfaces 94 of the transfer sprockets 91a, 91b, with the result that the engaging holes 7 of the sheets 1 are engaged without fail with the projections 95 formed on the outer circumferential surfaces 94 of the transfer sprockets.

As shown in FIGS. 13 and 14, the output shaft 86 of the gear box 76 and the rotary shaft 92a of the first transfer sprocket 91a are arranged in parallel. A first driving gear 97 and a primary pulley 98 are fixed to the output shaft 86, with a secondary pulley 99 fixed to the rotary shaft 92a. The secondary pulley 99 and the primary pulley 98 are interlocked each other via a second timing belt 100.

Figure 15:
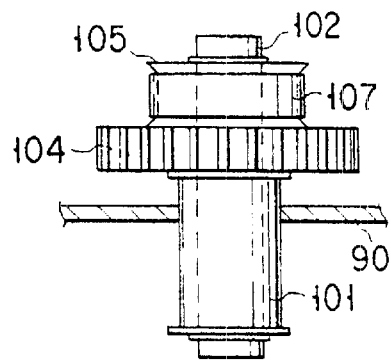
FIG. 15 is a cross sectional view along the line 15F—15F shown in FIG. 14.

As shown in FIGS. 12 and 15, a relay shaft 102 is rotatably supported by the second base plate 90 with a holder 101 interposed therebetween. The relay shaft 102 is interposed between the first and second transfer sprockets 91a and 91b and arranged in parallel to the output shaft 86. A second driving gear 104 and a primary pulley 105 are fixed to the relay shaft 102. The second driving gear 104 is in mesh with the first driving gear 97. These driving gears 97 and 104 are equal to each other in the number of teeth, with the result that the output shaft 86 and the relay shaft 102 are rotated at the same speed in opposite directions.

A secondary pulley 106 is fixed to the rotary shaft 92b of the second transfer sprocket 91b. The secondary pulley 106 and the primary pulley 105 are interlocked each other via a third timing belt 107. It follows that the power of the output shaft 86 is transmitted to the first transfer sprocket 91a via the primary pulley 98, the second timing belt 100 and the secondary pulley 99, and to the second transfer sprocket 91b via the first driving gear 97, the second driving gear 104, the primary pulley 105, the third timing belt 107 and the secondary pulley 106. It should be noted that the primary pulleys 98, 105 and the secondary pulleys 99, 106 are equal to each other in diameter. It follows that the first and second transfer sprockets 91a and 91b are intermittently rotated at the same speed in opposite directions at an interval of 30°.

The driven cases 93a, 93b for supporting the first and second transfer sprockets 91a, 91b are held between the first and second base plates 83 and 90 such that the fixing positions of these driven cases 93a, 93b can be controlled. It follows that the tensions of the second and third timing belts 100, 107 can be controlled by moving the fixing positions of the driven cases 93a, 93b relative to the first and second base plates 83, 90.

Figure 17:
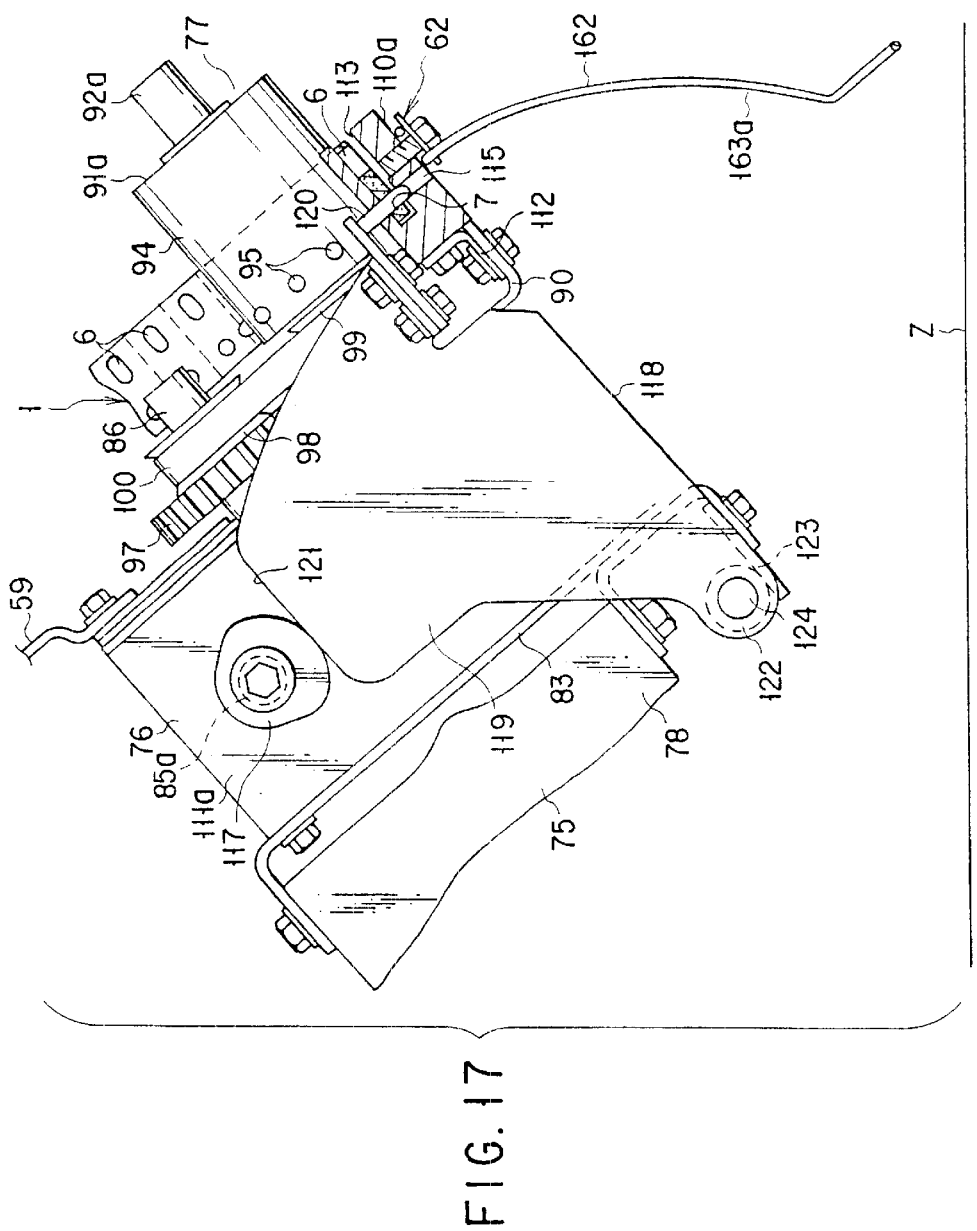
FIG. 17 is a side view of the first planting unit showing in a partly broken manner the state that the seedling-growing sheet is fixed.

As shown in FIGS. 14 and 17, the sheet fixing mechanism 62 serves to fix the planting piece 10, which is positioned immediately rearward of the planting piece 10 that is to be cut away from the seedling-growing sheet 1, while the movement of the sheet 1 is stopped.

The sheet fixing mechanism 62 comprises a pair of guide members, 110a, 110b and a pair of pin driving sections 111a, 111b. These guide member 110a and pin driving section 111a are arranged on one side of the sheet transfer mechanism 61. On the other hand, the other guide member 110b and the other pin driving section 111b are arranged on the opposite side of the sheet transfer mechanism 61. These guide members 110a and 110b are equal to each other in construction. Likewise, the pin driving sections 111a and 111b are equal to each other in construction. Thus, the guide member 110a and the pin driving section 111a positioned on the left side in the drawing will be described as representatives.

As shown most clearly in FIG. 17, the guide member 110a is fixed to an end portion of the second base plate 90 via a bracket 112 and positioned sideward of the first transfer sprocket 91a. One end portion of the guide member 110a extends to approach the outer circumferential surface 94 of the first transfer sprocket 91a, as shown in FIG. 14.

The guide member 110a includes a guide groove 113 extending to be tangent to the first transfer sprocket 91a at the lowermost position of the first transfer sprocket 91a. The seedling-growing sheet 1 forwarded from the first transfer sprocket 91a is guided into the guide groove 113. It follows that the guide member 110a also performs the function of guiding the seedling-growing sheet 1 forwarded from the first transfer sprocket 91a.

The guide member 110a has a pair of pin insertion holes 115 extending in a direction perpendicular to the guide groove 113 and contiguous to the guide groove 113. The pin insertion holes 115 are arranged apart from each other in the forwarding direction of the seedling-growing sheet 1. The distance between these pin insertion holes 115 is equal to the distance between adjacent engaging holes 7 of the seedling-growing sheet 1, with the result that the engaging hole 7 communicates with the pin insertion hole 115 while the movement of the seedling-growing sheet 1 is stopped.

As shown in FIGS. 14 and 17, the pin driving section 111a is provided with a plate cam 117 and a sheet stopper 118 moved by the plate cam 117. The plate cam 117 is fixed to a first edge 85a (or a second edge 85b) of the input shaft 85, with the result that the plate cam 117 is continuously rotated by the input shaft 85. The sheet stopper 118 comprises a plate-like stopper body 119 and a pair of pins 120 supported by the stopper body 119. The stopper body 119, which is arranged below the plate cam 117, is provided with an edge portion 121 slidably contacting the plate cam 117 and a pivot portion 122. The pivot portion 122 is rotatably pivoted to a bracket 123 fixed to the first base plate 83 via a pivot shaft 124. The stopper body 119 is urged by a return spring (not shown) toward the plate cam 117. As a result, the edge portion 121 of the stopper body 119 is kept pushed against the plate cam 117.

Figure 16:
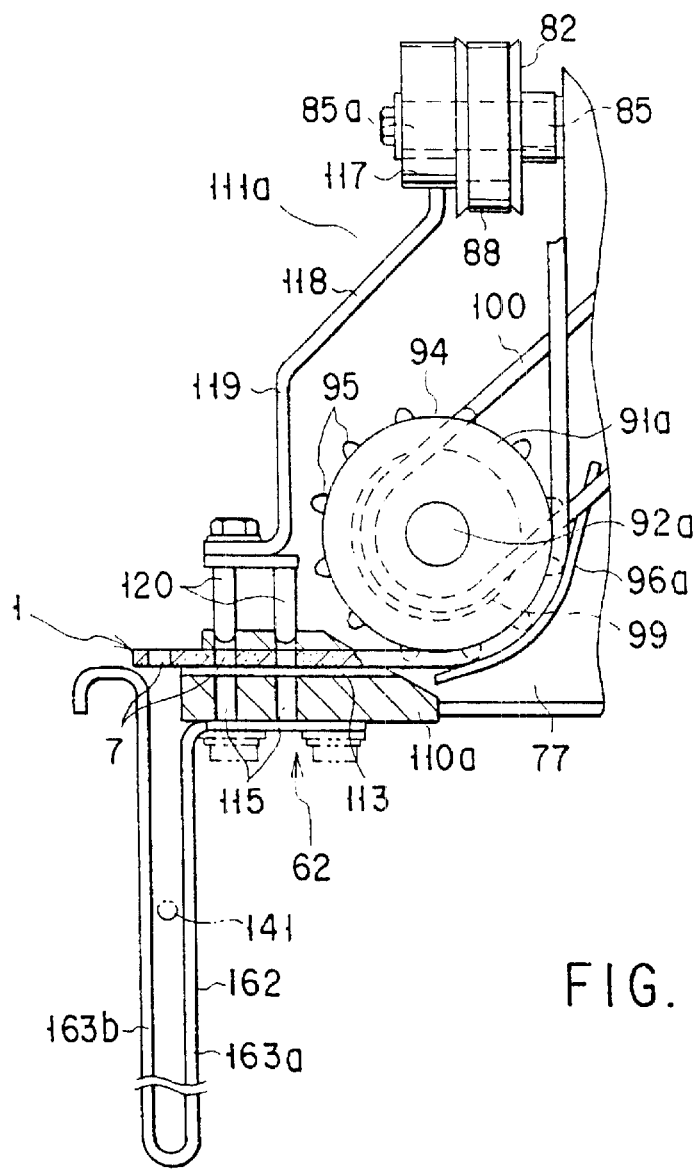
FIG. 16 is a plan view of the first planting unit showing in a partly broken manner the state that the fixing of the seedling-growing sheet is released.
Figure 18:
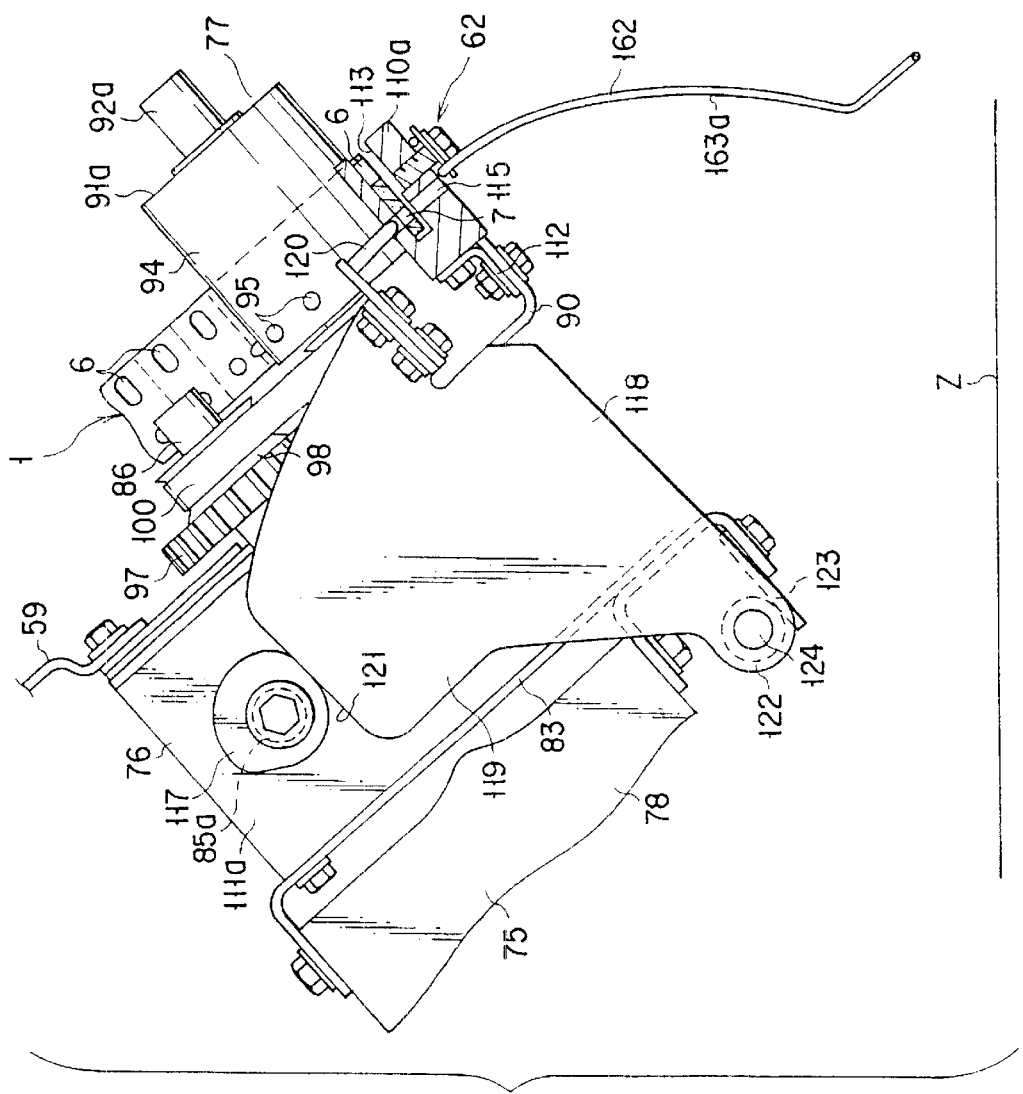
FIG. 18 is a side view of the first planting unit showing in a partly broken manner the state that the fixing of the seedling-growing sheet is released.

The pins 120 are arranged apart from each other and in parallel. The distance between these pins 120 is equal to the distance between adjacent engaging holes 7 made in the seedling-growing sheet 1. The pins 120 project toward the guide members 110a, 110b such that the tip portions of these pins 120 are inserted into the pin insertion holes 115. As a result, the sheet stopper 118 is alternately swung between a locking position (shown in FIGS. 14 and 17) at which the pin 120 crosses the guide groove 113 and an unlocking position (shown in FIGS. 16 and 18) at which the pin 120 is detached from the guide groove 113. The sheet stopper 118 is swung to the locking position while the first and second transfer sprockets 91a, 91b are held stopped. By this swinging, the pin 120 is inserted into the engaging hole 7 of the seedling-growing sheet 1 through the pin insertion hole 115, with the result that the seedling-growing sheet 1 is fixed to the guide members 110a, 110b. The sheet stopper 118 is also swung to the unlocking position during rotation of the first and second transfer sprockets 91a, 91b. By this swinging, the pin 120 is withdrawn from the guide groove 113, as shown in FIGS. 16 and 18, with the result that the pin 120 is disengaged from the engaging hole 7 so as to permit the seedling-growing sheet 1 to be moved forward.

Figure 19:
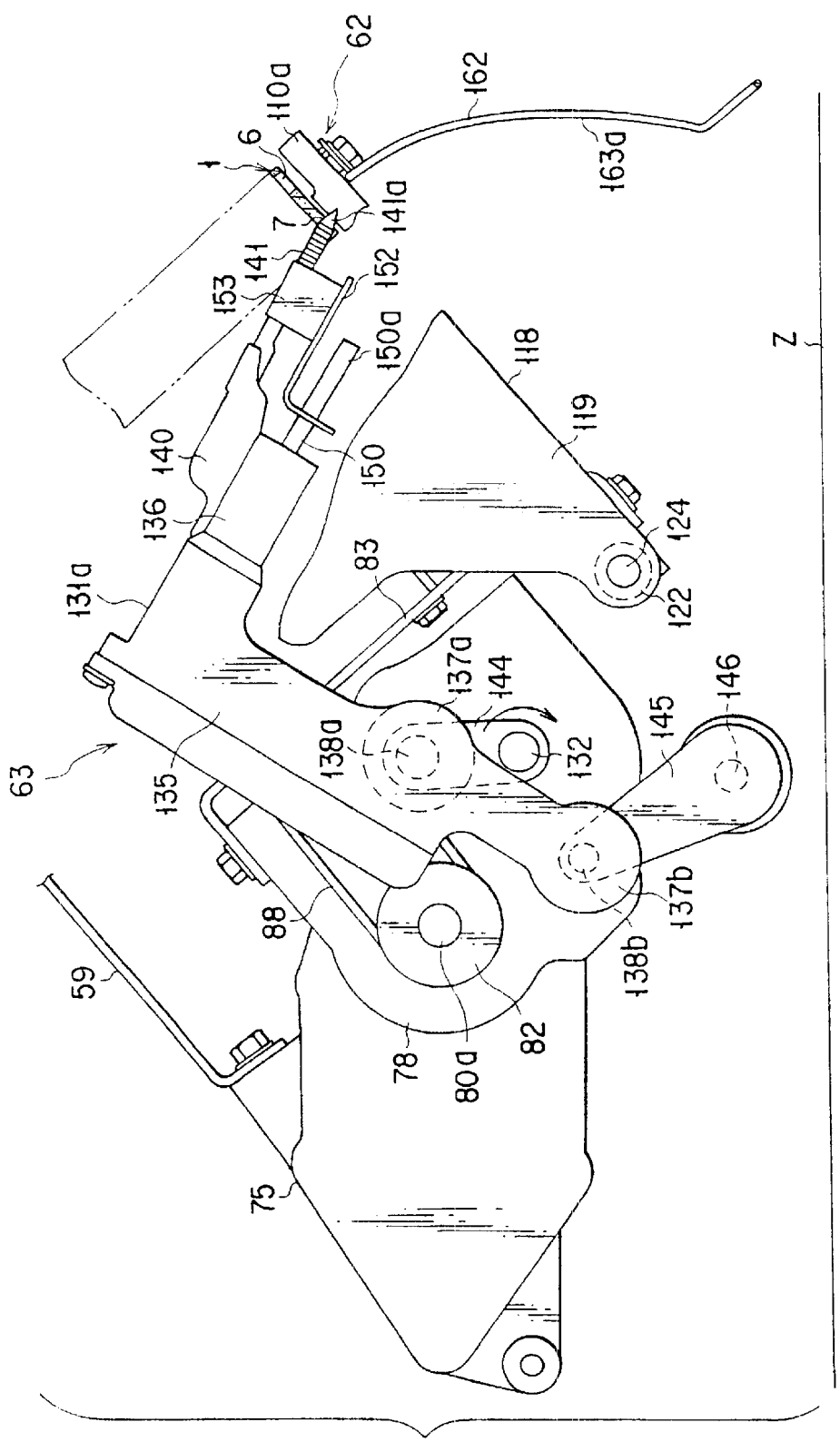
FIG. 19 is a side view showing a planting mechanism of the first planting unit.

As shown in FIGS. 12 and 19, the planting mechanism 63 includes a power transmitting section 130 and first and second planting arms 131a, 131b. The power transmitting section 130 includes a driving shaft 132 housed in the gear box 76. The driving shaft 132 is arranged in parallel to the intermediate shaft 80 and has the both end portions extending sideward of the drive case 78. The intermediate shaft 80 and the driving shaft 132 are interlocked with each other via driving gears 133a, 133b meshing with each other. As a result, the driving shaft 132 is rotated continuously in the clockwise direction in the drawing of FIG. 19 by the power transmitted from the PTO shaft 56.

The first and second planting arms 131a, 131b are arranged apart from each other with the drive case 78 interposed therebetween. Since these first and second planting arms 131a, 131b are equal to each other in construction, the first planting arm 131a will be described as a representative.

As shown in FIG. 21, the first planting arm 131a includes an arm body 135 and a rod supporting section 136 contiguous to the tip of the arm body 135. Each of these arm body 135 and rod supporting section 136 is hollow. The arm body 135 includes first and second bearing sections 137a, 137b rotatably supporting first and second supporting shafts 138a, 138b, respectively.

The rod supporting section 136 extends in a direction substantially perpendicular to the arm body 135. A planting claw 141 is mounted to the tip of the rod supporting section 136 with a holder 140 interposed therebetween. The planting claw 141 can be inserted into the engaging hole 7 at the tip of the seedling-growing sheet 1 so as to cut the planting piece 10 away from the seedling-growing sheet 1. The planting claw 141 is formed of a rod having a tapered tip 141a for facilitating the insertion of the planting claw 141 into the engaging hole 7 of the seedling-growing sheet 1. As shown in the drawing, the planting claw 141 extends in the axial direction of the rod supporting section 136.

As shown in FIG. 23, a plurality of grooves 142 are formed in the outer circumferential surface region of the planting claw 141. These grooves 142 are arranged a predetermined distance apart from each other in the axial direction of the planting claw 141. When the planting claw 141 is inserted through the engaging hole 7, the open edge of the engaging hole 7 is caught by the groove 142 so as to prevent the planting piece 10 from being detached from the planting claw 141.

Figure 20:
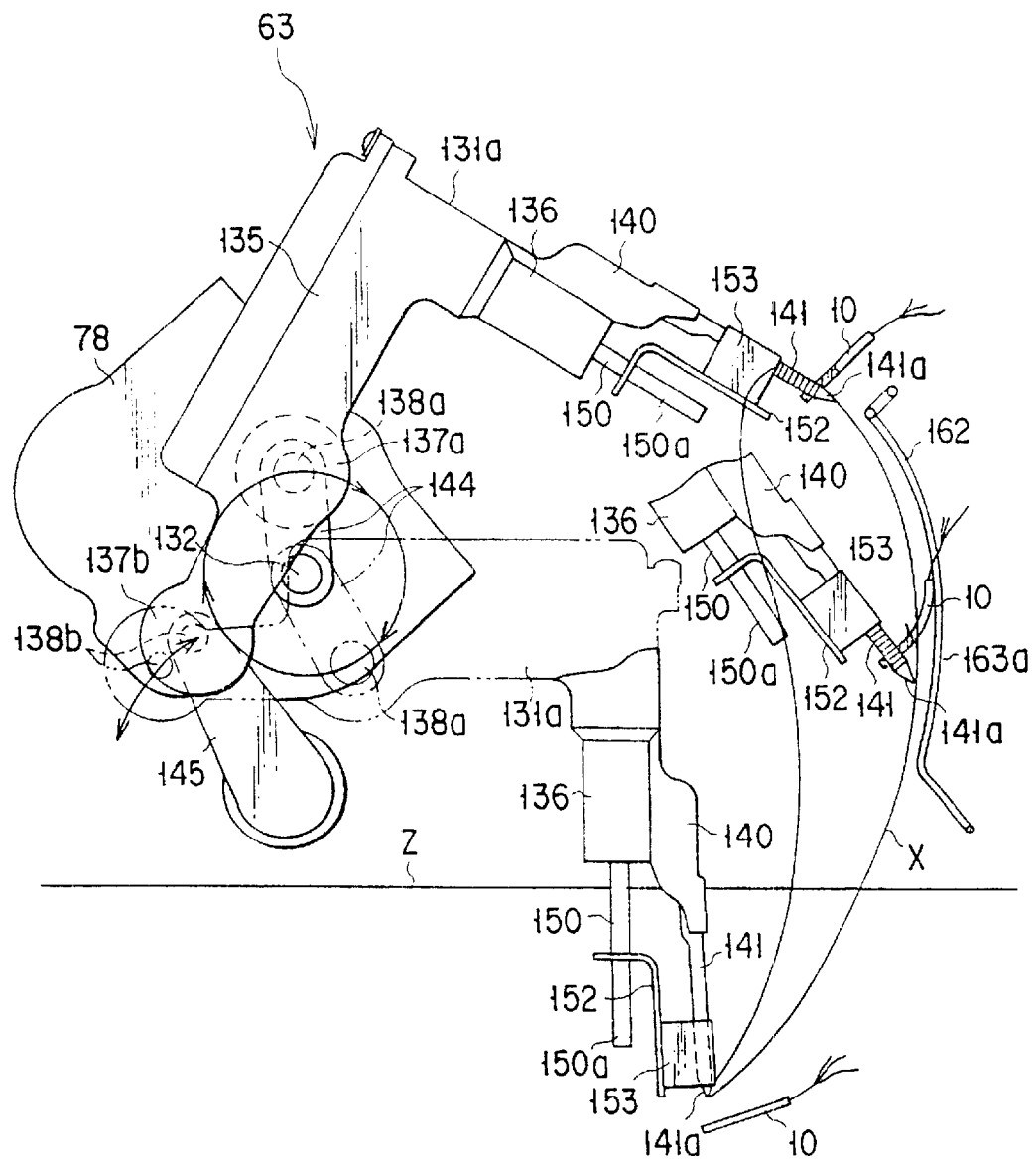
FIG. 20 is a side view of the planting mechanism showing the locus of movement of a planting claw.

As shown in FIGS. 19 and 20, the arm body 135 is supported by the drive case 78 via first and second crank arms 144, 145. The first crank arm 144 is fixed to extend over a region between an end portion of the driving shaft 132 and the first supporting shaft 138a, and is continuously rotated in the clockwise direction about the driving shaft 132 as denoted by an arrow in FIG. 20. On the other hand, the second crank arm 145 is swingably pivoted to the drive case 78 via a pivot shaft 146. The tip of the second crank arm 145 is fixed to the second supporting shaft 138b.

The particular construction described above permits the planting arm 131a to be moved up and down every time the first crank arm 144 makes one complete rotation, with the result that the tip 141a of the planting claw 141 is moved to depict a crescent-shaped locus X extending in a vertical direction, as shown in FIG. 20. To be more specific, every time the first crank arm 144 makes one complete rotation, the planting arm 131a is moved to cover a cutting position at which the planting claw 141 is caught by the engaging hole 7 of the seedling-growing sheet 1 and a planting position at which the planting claw 141, which is moved down from the cutting position, is stuck into the paddy field Z together with the planting piece 10. The rotating direction of the planting arm 131a is opposite to that of the front wheels 44 and the rear wheels 45 of the planting machine 41 when the planting machine 41 is moved forward.

When the forward movement of the seedling-growing sheet 1 is stopped to permit the seedling-growing sheet 1 to be locked by the pins 120 of the sheet stopper 118, the planting arm 131a is moved to the cutting position referred above, and the planting claw 141 is inserted through the engaging hole 7 of the plating piece 10. As a result, the planting piece 10 is cut away from the seedling-growing sheet 1 along the cutting perforations 8.

As shown in FIG. 21, the rod supporting section 136 of the planting arm 131a includes a pushing rod 150, which is supported movable in the axial direction of the rod supporting section 136 via a bush 151. The pushing rod 150 has a first end portion 150a positioned outside the rod supporting section 136 and a second end portion 150b positioned inside the rod supporting section 136. The first end portion 150a is arranged in parallel to the planting claw 141. Also, a pusher 153 is supported on the first end portion 150a via a bracket 152.

The pusher 153 serves to detach the planting piece 10 from the planting claw 141. As shown in FIG. 22, the pusher 153 is positioned adjacent to the planting claw 141 and has a concavity 154 through which passes the planting claw 141. It follows that the pusher 153 is movable between a first position near the tip 141a of the planting claw 141 and a second position away from the tip 141a of the planting claw 141. The pushing rod 150 is kept urged by a return spring 155 to have the pusher 153 urged toward, the second position.

As shown in FIG. 21, a driving mechanism 156 for moving the pusher 153 to the first position or the second position is housed within the arm body 135. The driving mechanism 156 includes a plate cam 157 and a relay lever 158 driven by the plate cam 157.

The plate cam 157 is fixed to the first supporting shaft 138a so as to be rotated together with the first supporting shaft 138a. On the other hand, the relay lever 158 is rotatably supported on the arm body 135 via a pivot pin 159. As shown in the drawing, the relay lever 158 bridges the plate cam 157 and the second end portion 150b of the pushing rod 150.

If the plate cam 157 is rotated via the first supporting shaft 138a, the pushing rod 150 is reciprocated in the axial direction in accordance with the shape of the plate cam 157. As a result, the pusher 153 is moved to cover the first position and the second position while the first crank arm 144 makes one complete rotation. It follows that the pusher 153 is brought back to the second position when the planting arm 131a is swung to the cutting position and is moved to the first position when the planting arm 131a is swung to the planting position.

As shown in FIGS. 14, 19 and 20, a mounting guide 162 is attached to each of the guide members 110a and 110b of the sheet fixing mechanism 62. The mounting guide 162 serves to guide the planting piece 10 cut away by the planting claw 141 to a position immediately above the paddy field Z.

The planting guide 162 is formed by continuously bending a metal rod circular in cross section and has a pair of guide rods 163a, 163b. These guide rods 163a, 163b extend downward in parallel from each of the guide members 110a, 110b. As shown in FIG. 20, the guide rods 163a, 163b are curved arcuate when viewed sideward of the planting arm 131a so as to extend along the locus X depicted by the tip 141a of the planting claw 141. The distance between the locus X depicted by the planting claw 141 and the guide rods 163a, 163b is set at about 10 mm.

As shown in FIG. 14, the distance T between the guide rods 163a and 163b is set smaller than the width of the planting piece 10 cut away from the seedling-growing, and the tip 141a of the planting claw 141 is positioned in the center between the adjacent guide rods 163a and 163b. It follows that the planting piece 10 cut away by the planting claw 141 is held by the guide rods 163a, 163b until the planting piece 10 is moved to a position immediately above the paddy field Z.

The seedlings are planted in the paddy field Z by the planting machine 40 as follows.

In the first step, the sheet roll 11 having seedlings grown from the seeds 15 housed therein is mounted to each of the turn tables 68 of each of the first to third planting units 58a to 58c. Then, the tip of the seedling-growing sheet 1 is withdrawn from each of the open portions 67 of the housing boxes 65a, 65b and guided toward each of the first and second transfer sprockets 91a, 91b along the guide members 71a, 71b, 72a, 72b so as to be inserted into each of the clearances formed between the first transfer sprocket 91a and the sheet guide 96a and between the second transfer sprocket 91b and the sheet guide 96b. In this step, the seedling-growing sheet 1 is wound about a part of the outer circumferential surface 94 of each of the first and second transfer sprockets 91a, 91b, and the engaging holes 7 of the seedling-growing sheet 1 are caught by the projections 95 of the transfer sprockets 91a, 91b. Then, the tip portion of the seedling-growing sheet 1 is guided into the guide groove 113 of each of the guide members 110a, 110b.

Under the condition described above, the power of the engine 46 is transmitted via the PTO shaft 56 to the output shaft 55 of the transmission device 54. The power transmitted to the output shaft 55 is divided through the intermediate. shaft 80 into the three systems of the sheet transfer mechanism 61, the sheet fixing mechanism 62 and the planting mechanism 63.

The power transmitted toward the sheet transfer mechanism 61 is transmitted from the intermediate shaft 80 to the input shaft 85 of the gear box 76 through the first timing belt 88. By this power transmission, the output shaft 86 of the gear box 76 is intermittently rotated at an interval of 30° while the input shaft 85 makes one complete rotation. The rotation of the output shaft 86 is transmitted to the first transfer sprocket 91a through the primary pulley 98, the second timing belt 100, and the secondary pulley 99, and to the second transfer sprocket 91b through the first and second driving gears 97, 104, the primary pulley 105, the third timing belt 107 and the secondary pulley 106. As a result, the first and second transfer sprockets 91a, 91b are intermittently rotated in opposite directions at the same speed so as to send out the seedling-growing sheet 1 pitch by pitch. The movement of the seedling-growing sheet 1 is temporarily stopped at the time when the top planting piece 10 to be cut away is forwarded sideward of the guide groove 113 as shown in FIG. 14. The sheet 1 is kept stopped while the input shaft 85 of the gear box 76 makes ⅔ of one complete rotation (240°).

The power transmitted from the intermediate shaft 80 toward the sheet fixing mechanism 62 serves to continuously rotate the plate cam 117 via the first timing belt 88. By the rotation of the plate cam 117, the sheet stopper 118 is swung between the locking position and the unlocking position repeatedly. While the seedling-growing sheet 1 is being moved forward, the sheet stopper 118 is kept at the unlocking position to permit the pin 120 to be withdrawn from the guide groove 113. When the movement of the seedling-growing sheet 1 is stopped, the sheet stopper 118 is held at the locking position to permit the pin 120 extending through the guide groove 113 to be inserted through the engaging hole 7 of the seedling-growing sheet 1. As a result, the planting piece 10 immediately rearward of the top planting piece 10 that is to be cut away from the seedling-growing sheet 1 is firmly fixed by the guide members 110a, 110b so as to prevent the seedling-growing sheet 1 from being bent.

The power transmitted from the intermediate shaft 80 toward the planting mechanism 63 serves to rotate the first crank arm 144 in the clockwise direction via the driving gears 133a, 133b and the driving shaft 132. As a result, the planting arms 131a, 131b are moved up and down between the cutting positions and the planting positions to depict the crescent-shaped locus X, as shown in FIG. 20. When the planting arms 131a, 131b have reached. the cutting positions, the movement of the seedling-growing sheets 1 is stopped, and the sheet stoppers 118 are held in the locking positions. Therefore, the planting claw 141 of each of the planting arms 131a, 131b is inserted from above into the engaging hole 7 at the tip of the seedling-growing sheet 1 sent from the guide groove 113. As a result, the planting piece 10 at the top is pulled downward by the planting claw 141 so as to be cut away from the seedling-growing sheet 1 along the cutting perforation 8. The planting piece 10 thus cut away is held by the planting claw 141 and transferred onto the paddy field Z. During the transferring step, the planting piece 10 is in contact with the guide rods 163a, 163b so as to prevent the planting piece 10 from dropping from the planting claw 141 and to prevent the posture of the planting piece 10 from being changed.

While the planting arms 131a, 131b are moved from the cutting positions to reach the planting positions, the pusher 153 is held at the second position. When the planting arms 131a, 131b are moved to reach the planting positions, rotation of the plate cam 157 causes the relay lever 158 to push the pusher rod 150, with the result that the pusher 153 is moved from the second position to the first position. As a result, the planting piece 10 is pushed out of the planting claw 141 so as to be planted forcedly into the paddy field Z.

The seedling-growing sheet 1 of the present invention produces prominent effects as described in the following.

To reiterate, the seedling-growing sheet 1 comprises the porous sheet body 4 having a large number of receptacles 6 having seeds 15 housed therein and the support member 3 bonded to the sheet body 4. Since the seedlings grow from the seeds 15 within the receptacles 6, soil need not be used for growing the seedlings, making it possible to grow the seedlings under a clean environment. In addition, since the seedling-growing sheet 1 itself can be made small in size and light in weight, the seedling-growing sheet 1 can be handled easily. It is also possible to save the labor in transferring the seedling-growing sheet 1.

Also, a large number of rows of cutting perforations 8, each row being arranged across the width of the seedling-growing sheet 1, are arranged a predetermined distance apart from each other in the longitudinal direction of the seedling-growing sheet 1. Each row of the cutting perforations 8 is positioned intermediate between adjacent receptacles 6 housing the seeds 15. It follows that the planting piece 10 can be cut away from the seedling-growing sheet 1 one by one without fail along the cutting perforations 8. What should be noted is that the planting piece 10 is prevented from being broken partially. Also, a plurality of planting pieces 10 are prevented from being cut away together from the seedling-growing sheet 1. It follows that the operation of planting the planting pieces 10 in the paddy field Z can be carried out continuously and smoothly.

Each of the support member 3 and the sheet body 4 of the seedling-growing sheet 1 is made of a biodegradable material. It follows that, even if the planting piece 10 including the support member 3 and the sheet body 4 is left buried in the paddy field Z after the planting operation, the support member 3 and the sheet body 4 are biologically degraded and decomposed within the paddy field Z. In other words, the support member 3 and the sheet body 4 that are left buried in the paddy field Z do not produce an environmental problem.

It should also be noted that, since a large number of seeds 15 are housed in the band-like seedling-growing sheet 1 a predetermined distance apart from each other in the longitudinal direction of the sheet 1, a large number of seedlings can be grown simultaneously by using a single seedling-growing sheet 1. In other words, the seedling-growing sheet 1 of the present invention makes the mass production of seedlings possible. In addition, since the seedling-growing sheet 1 is in the shape of a band, the seedlings grown in the sheet 1 can be transferred easily in the longitudinal direction of the seedling-growing sheet 1 so as to improve the operability of planting the seedlings in the paddy field Z. Naturally, the seedlings can be planted in the paddy field Z efficiently.

When the seedlings are grown and when the seedling-growing sheet 1 is mounted to the turn table 68 of the planting machine 40, the sheet 1 is in the form of the sheet roll 11, which is compact. It follows that a large space is not required in the step of growing the seedlings. In addition, the seedling-growing sheet 1 can be transferred easily and can be set easily on the turn table 68 of the planting machine 40.

In preparing the sheet roll 11, the seedling-growing sheet 1 is wound such that the sheet body 4 including the receptacles 6 of the sheet 1 is positioned outside, with the result that the roots growing from the seeds 15 of the adjacent turns of the sheet roll 11 are markedly prevented from being tangled each other.

The receptacles 6 for housing the seeds 15 are arranged in an upper portion of the sheet body 4. As a result, the growth of the leaves growing upward from the seeds 15 is promoted, making it possible to allow almost all the seedlings to grow satisfactorily. It follows that the seedlings grown in the seedling-growing sheet 1 can be planted continuously into the paddy field Z.

The upper end of the receptacle 6 is positioned very close to the upper surface 4a of the sheet body 4 so as to facilitate the germination of the rice seed 15 and growth of the leaves. In addition, the leaves are allowed to grow upward. It should be noted that, if the upper end of the receptacle 6 is allowed to be open to the upper surface 4a of the sheet body 4, the germination of the rice seed 15 and the growth of the leaves from the rice seed 15 are more facilitated.

The receptacle 6 of the sheet body 4 is in the shape of an ellipsoid having the long axis extending in the width direction of the sheet body 4. Thus, the rice seed 15 can be housed in the receptacle 6 such that the embryo 35a of the rice seed 15 is positioned in the upper portion of the receptacle 6. As a result, the germination of the rice seed 15 is promoted, and the leaves are allowed to grow upward from the embryo 35a as desired. To be more specific, it is important for the plumule 35c to be positioned in an upper or sideward position of the rice seed 15 in the germinating process of the rice seed 15, as shown in FIGS. 5A to 5C. It follows that the particular posture taken by the rice seed 15 in the receptacle 6 is effective for the normal growth of the seedling.

In addition, since the cutting perforations 8 extending in the thickness direction of the laminate body 2 are formed in the seedling-growing sheet 1, the planting piece 10 is cut away from the sheet 1 with the support member 3 made of a film having a high mechanical strength bonded to the sheet body 4 even if the roots grown from the adjacent rice seeds 15 are tangled with each other. Thus, tangling of the roots grown from the adjacent rice seeds 15 can be neglected to permit the planting piece 10 to be cut away easily. It follows that the planting piece 10 having the seedling grown from the rice seed 15 can be planted satisfactorily in the paddy field Z.

In addition, the seedling grown from the rice seed 15 held by the seedling-growing sheet 1 is grown by means of hydroponics. As a result, the seedling can be grown easily and the growth of the seedling can be controlled easily, leading to a reduced cost required for the growth of the seedlings. It follows that the technique of the present invention is adapted for mass production of the seedlings.

A large number of engaging holes 7 are formed apart from each other in the longitudinal direction of the seedling-growing sheet 1. Since these engaging holes 7 are caught one by one by the projections 95 of the first and second transfer sprockets 91a, 91b, the seedling-growing sheet 1 can be sent forth pitch by pitch without fail. In addition, since the engaging holes 7 are caught by the projections 95, the seedling-growing sheet 1 does not slip along the outer circumferential surfaces 94 of the first and second transfer sprockets 91a, 91b. It follows that the moving speed of the seedling-growing sheet 1 can be controlled constant and can be changed as desired.

Further, the seedling-growing sheet 1 of the present invention is effective in that the rice seed 15 housed in the receptacle 6 of the sheet body 4 can be sown directly in the paddy field Z.

The method of the present invention for manufacturing the seedling-growing sheet 1 comprises a first step of preparing a large block of a porous material, a second step of slicing the large block into a band-like sheet body 4, a third step of laminating the sheet body 4 on a support member 3 to prepare a band-like laminate body 2, and a fourth step of applying a blanking treatment to the laminate body 2 to form the receptacles 6, the engaging holes 7 and the cutting perforations 8 in the laminate body 2. It should be noted that these first to fourth steps for manufacturing the seedling-growing sheet 1 can be arranged continuously on a single line, making it possible to manufacture the seedling-growing sheet 1 efficiently. In addition, the method of the present invention is adapted for mass production of the seedling-growing sheets 1.

The planting machine 40 of the present invention for planting the plating piece 10 cut away from the seedling-growing sheet 1 in the paddy field Z produces prominent effects as described below.

As described previously, the planting machine 40 comprises the planting device 42 mounted on the running vehicle 41. The planting device 42 includes the sheet-fixing mechanism 62 arranged adjacent to the engaging position between the planting claw 141 and the engaging hole 7 of the seedling-growing sheet 1. The sheet-fixing mechanism 62 includes pins 120 inserted into engaging holes 7 immediately rearward of the engaging hole 7 of the planting piece 10 that is to be cut away from the seedling-growing sheet 1 while the movement of the seedling-growing sheet 1 by the first and second transfer sprockets 91a, 91b is stopped. As a result, the seedling-growing sheet 1 contiguous to the planting piece 10 that is to be cut away is firmly caught by the guide grooves 113 of the guide members 110a, 110b. It follows that the seedling-growing sheet 1 can be prevented from being bent when the planting piece 10 at the tip of the seedling-growing sheet 1 is cut away by the planting claw 141. Naturally, the planting pieces 10 can be cut away one by one along the cutting perforations 8 easily and without fail, making it possible to prevent the planting piece 10 from being broken partially. It is also possible to prevent a plurality of planting pieces 10 from being cut away simultaneously. It follows that a large number of planting pieces 10 housing rice seedlings can be planted continuously in the paddy field Z.

In order to improve the planting efficiency of the rice seedlings, it is desirable to increase the moving speeds of the planting arms 131a, 131b. If the moving speed is increased, a strong force is instantly applied to a region around the engaging hole 7 when the planting piece 10 is cut away from the seedling-growing sheet 1 by the planting claw 141.

In the present invention, however, the cutting perforations. 8 formed in the seedling-growing sheet 1 extend through the laminate body 2 in its thickness direction. Therefore, if the planting claw 141 is inserted through the engaging hole 7, the planting piece 10 is promptly cut away from the seedling-growing sheet 1 along the cutting perforations 8. It follows that the planting piece 10 that is to be planted is not broken around the engaging hole 7 so as to be cut away satisfactorily from the seedling-growing sheet 1.

It should also be noted that the planting device 42 includes a planting guide 162 arranged along the locus X depicted by the planting claw 141 when the planting claw 141 is moved between the cutting position and the planting position. As a result, the planting piece 10 cut away from the seedling-growing sheet 1 is kept in contact with the guide rods 163a, 163b of the planting guide 162 when the planting piece 10 is moved from the cutting position to the planting position. It follows that the planting piece 10 held by the planting claw 141 is prevented from being changed in its posture and from dropping from the planting claw 141 without fail, making it possible to plant the planting piece 10 at a desired position of the paddy field Z accurately as desired.

Figure 24:
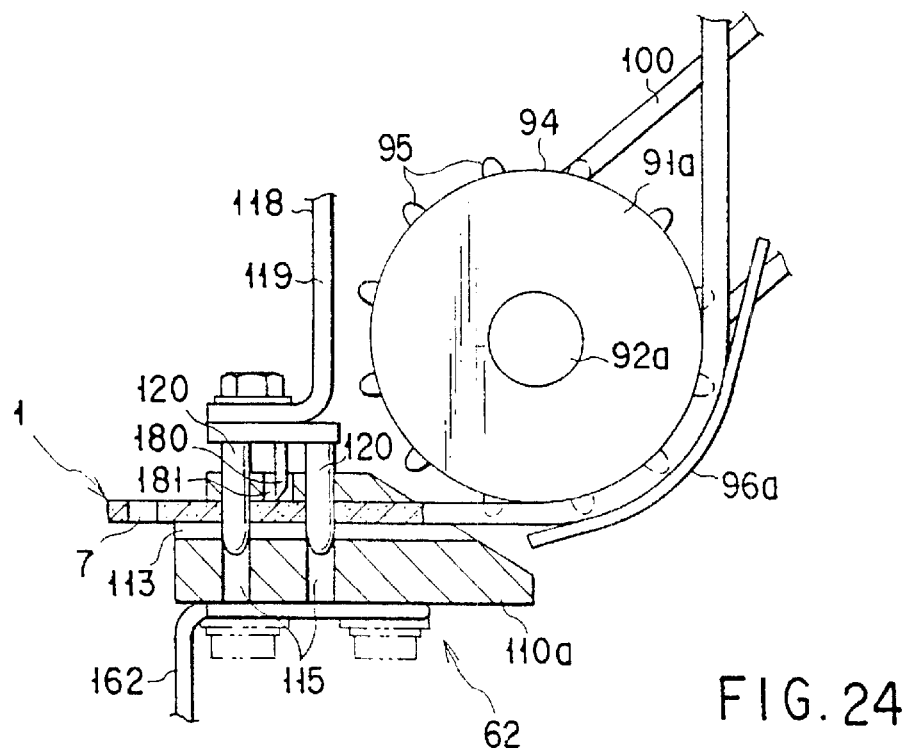
FIG. 24 is a cross sectional view of a sheet fixing mechanism showing the state that a cutter has pierced the seedling-growing sheet in the step of fixing the seedling-growing sheet in a second embodiment of the present invention.
Figure 25:
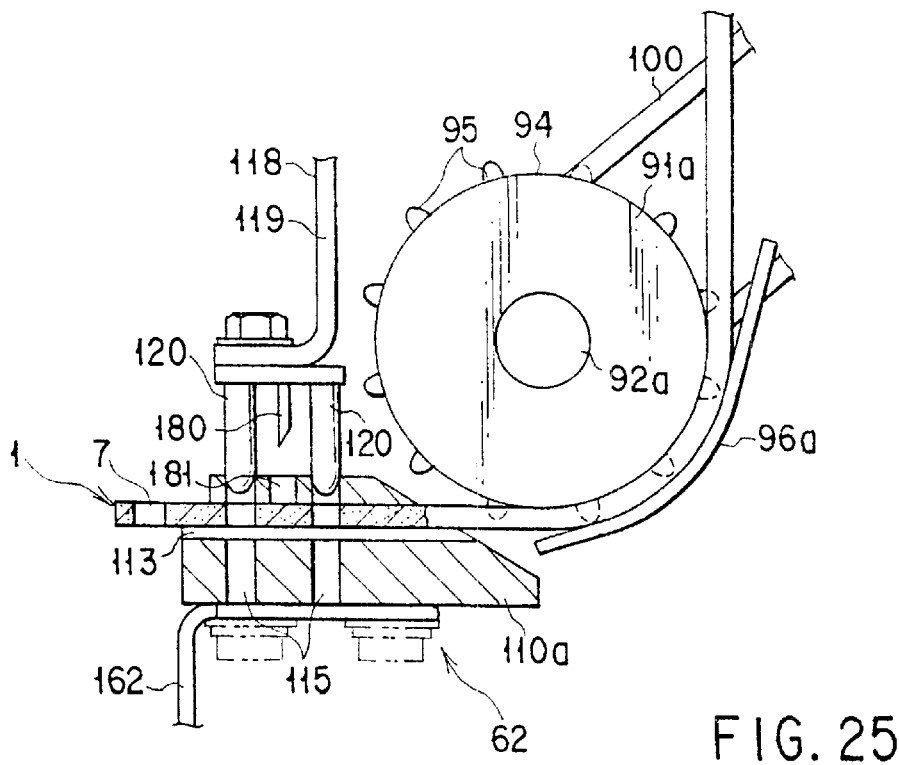
FIG. 25 is a cross sectional view of the sheet fixing mechanism showing the state that the lock of the seedling-growing sheet has been released and the cutter has been detached from the seedling-growing sheet.

The present invention is not limited to the first embodiment described above. Specifically, FIGS. 24 and 25 show a second embodiment of the present invention. The second embodiment differs from the first embodiment mainly in the construction of the sheet-fixing mechanism 62. In other words, the basic construction in other respects of the planting device 42 of the second embodiment is substantially equal to that of the first embodiment.

As shown in FIG. 24, the sheet-fixing mechanism 62 comprises the sheet stopper 118 provided with a cutter 180. The cutter 180, which is for forming cutting perforation in the seedling-growing sheet 1, is supported between the pins 120 by the stopper body 119 such that a sharp edge thereof faces the seedling-growing sheet 1.

The guide member 110a of the sheet-fixing mechanism 62 is provided with a through-hole 181 positioned to correspond to the cutter 180. The through-hole 181 communicates with the guide groove 113, with the result that the edge of the cutter 180 is guided into the guide groove 113 through the through-hole 181.

As shown in FIG. 25, the cutter 180 is withdrawn to the outside of the guide member 110a so as to be retreated from the guide groove 113 as far as the sheet stopper 118 is moved to the unlocking position.

If the movement of the seedling-growing sheet 1 is stopped prior to the cutting of the planting piece 10 by the planting claw 141, the sheet stopper 118 is moved from the unlocking position to the locking position, as shown in FIG. 24. By this movement, the pins 120 are inserted into the engaging holes 7 of the seedling-growing sheet 1 through the pin insertion holes 115. At the same time, the edge of the cutter 180 passes through the through-hole 181 so as to proceed into the guide groove 113. As a result, the edge of the cutter 180 is stuck against the seedling-growing sheet 1 so as to form cutting perforation in the seedling-growing sheet 1 such that the cutting perforation is interposed between the adjacent engaging holes 7 of the seedling-growing sheet 1.

The particular construction permits formation of cutting perforations when the seedling-growing sheet 1 is locked by the pins 120. These cutting perforation and the cutting perforations 8 collectively facilitate the cutting of the planting piece 10 from the seedling-growing sheet 1 more effectively.

If cutting perforation is formed in the seedling-growing sheet 1 by the cutter 180, a seedling-growing sheet that is not provided in advance with the cutting perforations 8 can be used for the planting operation of the seedlings. If the cutting perforations 8 are not formed in advance in the seedling-growing sheet, the seedling-growing sheet is prevented from being folded or cut away undesirably along the cutting perforations 8 during the seedling-growing process within the seedling-growing device 21, in the mounting step of the seedling-growing sheet on the turn table 68 of the planting device 42, or during transfer of the sheet roll of the seedling-growing sheet. In other words, the band-like shape of the seedling-growing sheet can be retained, thereby to facilitate the handling of the seedling-growing sheet.

Figure 26A:
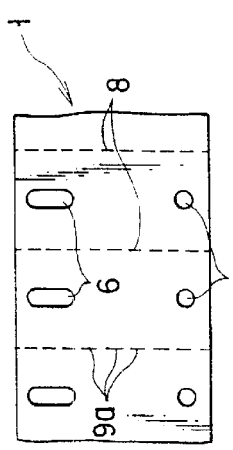
FIGS. 26A to 26C are plan views of the seedling-growing sheets showing different modes of cutting perforations of the sheets.
Figure 26B:
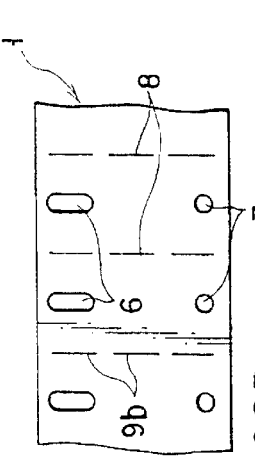
Figure 26C:
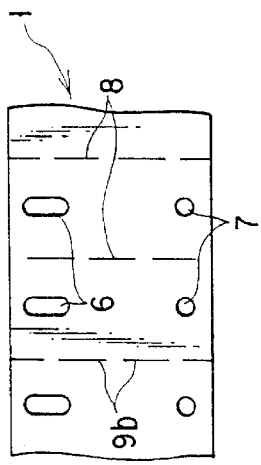

FIGS. 26A to 26C show other modes of cutting perforations 8 formed in the seedling-growing sheet 1. Specifically, the cutting perforations 8 shown in FIG. 26A consist of a large number of fine cut lines 9a having the same length and equidistantly arranged to form a cutting line. On the other hand, the cutting perforations 8 shown in each of FIGS. 26B and 26C consist of a plurality of slender cut lines 9b longer than the fine cut lines 9a and arranged to form a cutting line. The cut lines 9b shown in FIG. 26B do not extend to reach the edges in the width direction of the laminate body 2.

In forming the slender cut lines 9b in the laminate body 2, it is desirable for the slender cut lines 9b forming a cutting line to be deviant from the slender cut lines 9b forming the adjacent cutting line in the width direction of the laminate body 2, as shown in FIG. 26C. The particular construction is effective in that, when a certain planting piece 10 is cut away from the seedling-growing sheet 1 along a certain cutting perforations 8, the adjacent planting piece 10 is prevented from being cut away simultaneously along the adjacent cutting perforations 8.

Figure 27:
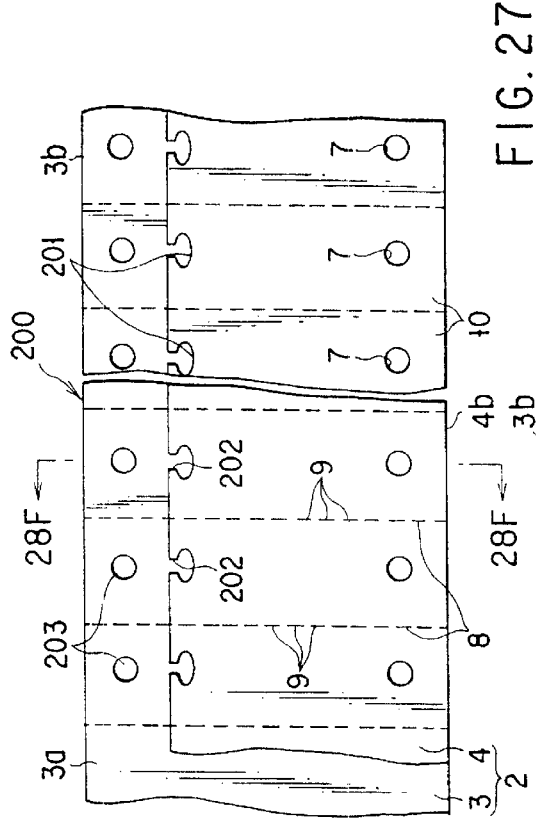
FIG. 27 is a plan view showing a seedling-growing sheet according to a third embodiment of the present invention.
Figure 28:
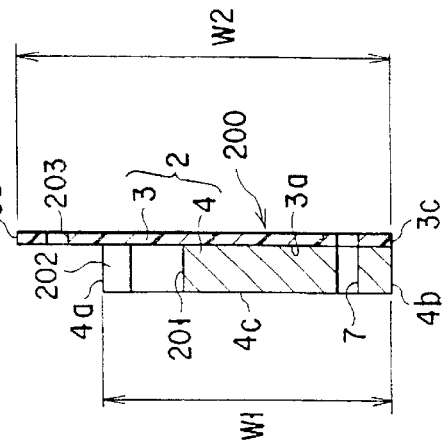
FIG. 28 is a cross sectional view along the line 28F—28F shown in FIG. 27.

FIGS. 27 and 28 show a seedling-growing sheet 200 according to a third embodiment of the present invention. Those portions of the seedling-growing sheet 200 which are equal to those of the seedling-growing sheet 1 of the first embodiment are denoted by the same reference numerals so as to avoid an overlapping description.

As shown in FIG. 28, the width W1 of the sheet body 4 is set smaller than the width W2 of the support member 3. The sheet body 4 is bonded to the bonding plane 3a of the support member 3 with the lower surface 4b of the sheet body 4 aligned with the lower edge 3c of the support member 3. It follows that an upper portion of the bonding plane 3a of the support member 3 is not covered with the sheet body 4 so as to be exposed to the outside.

A large number of receptacles 201 for housing rice seeds 15 are formed in an upper portion of the sheet body 4. The receptacles 201 are formed in concavities open to the side surface 4c of the sheet body 4 and are equidistantly arranged to form a column in the longitudinal direction of the sheet body 4.

As shown in FIG. 27, the receptacle 201 communicates with an open portion 202 open to the upper surface 4a of the sheet body 4. It follows that the receptacle 201 is open to both the side surface 4c and the upper surface 4a of the sheet body 4. The open portion 202 facilitates the sowing of the rice seed 15 in the receptacle 201 and promotes the germination of the rice seed 15. The width of the open portion 202 is set smaller than the width of the open portion of the receptacle 201.

A large number of transfer holes 203 having circular cross sections are formed in an upper portion of the support member 3. These transfer holes 203 are equidistantly arranged to form a column in the longitudinal direction of the support member 3 and positioned on the opposite side of the engaging holes 7 with the receptacles 201 interposed therebetween. The interval of these transfer holes 203 is equal to that of the engaging holes 7.

As shown in FIG. 27, the laminate body 2 is provided with cutting perforations 8 as in the first embodiment. These cutting perforations 8 equidistantly arranged apart from each other in the longitudinal direction of the laminate body 2. These cutting perforations 8 are arranged such that the receptacle 201, the engaging hole 7 and the transfer hole 203 are interposed between adjacent cutting perforations 8.

The seedling-growing sheet 200 of the particular construction is in the form of a sheet roll wound such that the sheet body 4 faces inward during the seedling-growing step using the seedling-growing device 21 and in the step of planting the grown seedlings in the paddy field. Since the sheet 200 is wound such that the sheet body 4 faces inward, the receptacles 201 of the sheet body 4 in the outermost turn of the sheet roll are covered with the support member 3, with the result that the rice seeds 15 are prevented from being dropped from within the receptacles 201.

The seedling-growing sheet 200 comprises the engaging holes 7 and the transfer holes 203 vertically facing the engaging holes 7 with the receptacles 201 interposed therebetween. Therefore, if projections catching these transfer holes 203 and the engaging holes 7 are formed on the outer circumferential surfaces of the first and second transfer sprockets 91a, 91b for transferring the seedling-growing sheet 200, the seedling-growing sheet 200 can be prevented from being inclined and can be transferred smoothly. It follows that the transferring posture of the seedling-growing sheet 200 can be maintained constant, and the planting piece 10 can be cut away without fail from the sheet 200 for the planting in the paddy field.

Figure 29:
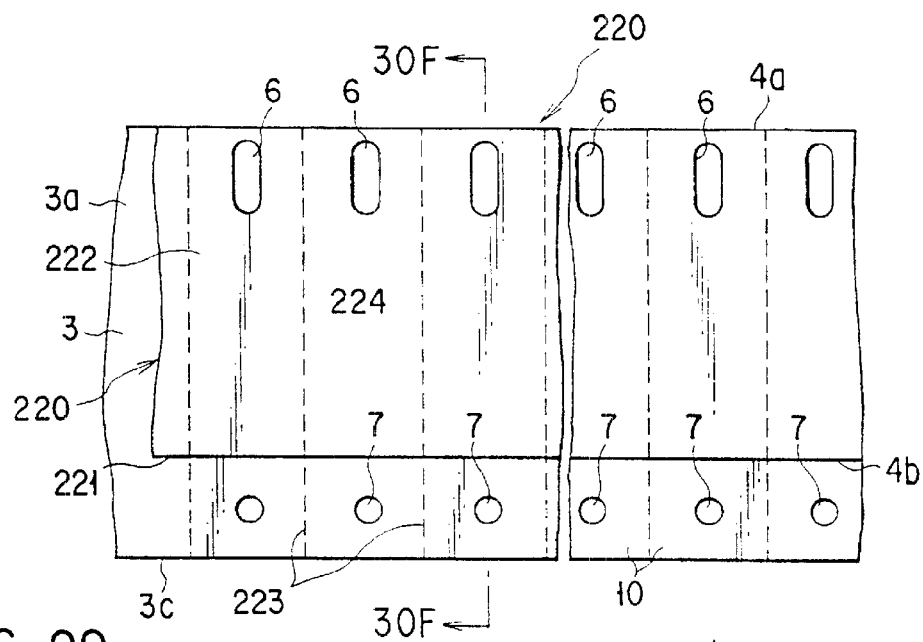
FIG. 29 is a plan view showing a seedling-growing sheet according to a fourth embodiment of the present invention.
Figure 30:
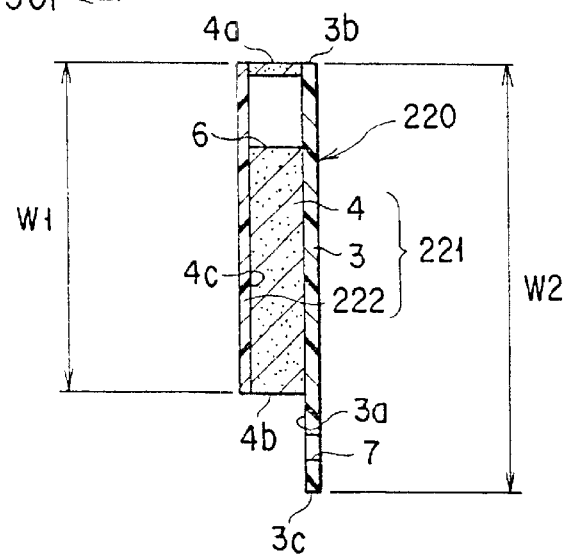
FIG. 30 is a cross sectional view along the line 30F—30F shown in FIG. 29.

FIGS. 29 and 30 show a seedling-growing sheet 220 according to a fourth embodiment of the present invention. Those portions of the seedling-growing sheet 220 which are equal to those of the seedling-growing sheet 1 of the first embodiment are denoted by the same reference numerals so as to avoid an overlapping description.

As shown in FIG. 30, the seedling-growing sheet 220 comprises a laminate body 221 consisting of the support member 3, the sheet body 4 and a reinforcing sheet 222. The width W1 of the sheet body 4 is set smaller than the width W2 of the support member 4. The sheet body 4 is bonded to the bonding plane 3a of the support member 3 with the upper surface 4a of the sheet body 4 aligned with the upper edge 3b of the support member 3, with the result that a lower portion of the bonding plane 3a of the support member 3 is not covered with the sheet body 4 so as to be exposed to the outside.

The reinforcing sheet 222 is bonded to the side surface 4c of the sheet body 4, with the result that the sheet body 4 is sandwiched between the support member 3 and the reinforcing sheet 222.

A large number of receptacles 6 for housing rice seeds 15 are formed in an upper portion of the laminate body 221. The receptacle 6 is formed in a recess extending through the reinforcing sheet 222 and the sheet body 4 and is open on the side opposite to the support member 3. These receptacles 6 are equidistantly arranged to form a column extending in the longitudinal direction of the laminate body 221. The receptacle 6 has an elliptical open portion the long axis of which extends in the width direction of the laminate body 221, with the result that the rice seed 15 is housed in the receptacle 6 such that the embryo 35a of the rice seed 15 is positioned in an upper portion of the receptacle 6.

A large number of engaging holes 7 are formed in a lower portion of the support member 3. These engaging holes 7 are equidistantly arranged to form a column extending in the longitudinal direction of the laminate body 221 and are positioned below the receptacles 6.

As shown in FIG. 29, a large number of cutting perforations 223 extending through the support member 3, the sheet body 4 and the reinforcing sheet 222 are formed in the laminate body 221. Each of cutting perforations 223 consists of a plurality of slit-like cut lines 224. These cutting perforations 223 extending straight across the width of the laminate body 221 and arranged a predetermined distance apart from each other in the longitudinal direction of the laminate body 221. As apparent from the drawing, the receptacle 6 and the engaging hole 7 are arranged intermediate between two adjacent cutting perforations 223.

The seedling-growing sheet 220 is in the form of a sheet roll wound such that the reinforcing sheet 222 faces inward during the seedling-growing step in the seedling-growing device 21 and in the step of planting the grown seedlings in the paddy field. Since the seedling-growing sheet 220 is wound into a roll such that the reinforcing sheet 222 faces inward, the receptacle 6 of the laminate body 221 in the outermost turn of the sheet roll is covered with the support member 3, with the result that the rice seeds 15 are prevented by the support member 3 from being dropped from within the receptacles 6.

Figure 31:
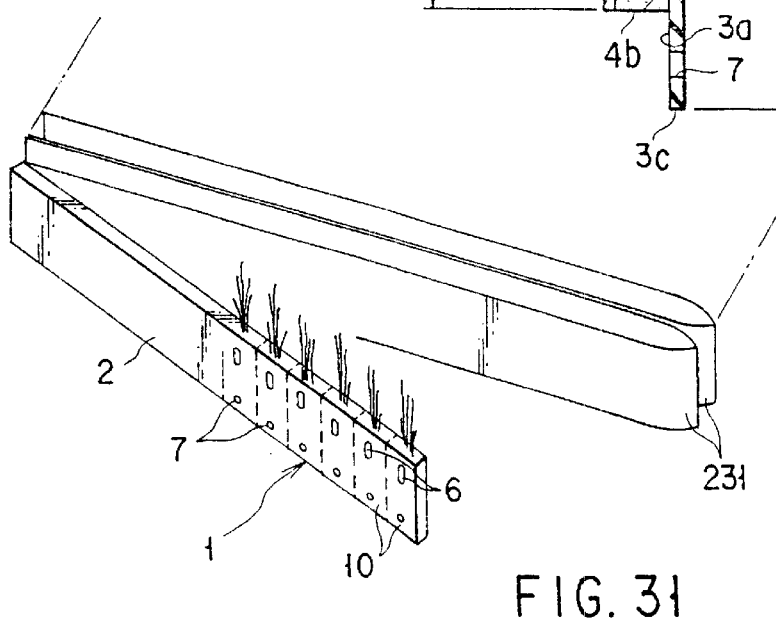
FIG. 31 is a perspective view showing a seedling-growing sheet according to a fifth embodiment of the present invention.

FIG. 31 shows a fifth embodiment of the present invention. In the fifth embodiment, the seedling-growing sheet 1 of the first embodiment is kept folded zigzag during the seedling-growing step and the step of planting the grown seedlings in the paddy field. To be more specific, the seedling-growing sheet 1 consists of a large number of rectangular folding pieces 231 that are arranged side by side in mutual contact. In the fifth embodiment, it is desirable to interpose a shielding member made of, for example, a paper sheet or a synthetic resin sheet between the adjacent folding pieces 231 so as to prevent the roots growing from the rice seeds 15 from being tangled with each other.

The seedling-growing sheet 200 of the third embodiment shown in FIG. 27 or the seedling-growing sheet 220 of the fourth embodiment shown in FIG. 29 can be used in place of the seedling-growing sheet 1 that is folded zigzag by about 180°. In this case, however, the support member 3 should be formed of an unwoven fabric having a flexibility in place of the film used in the first embodiment because the seedling-growing sheet 1, 200 or 220 is folded by about 180°.

Figure 32:
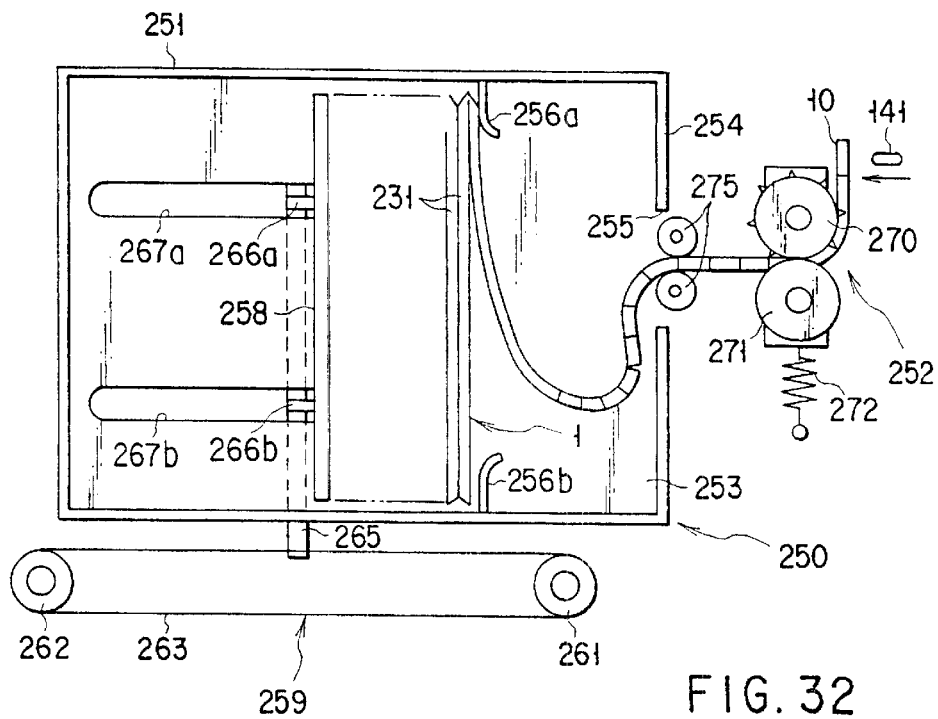
FIG. 32 is a plan view showing in a simplified fashion a planting device using the seedling-growing sheet shown in FIG. 31.
Figure 33:
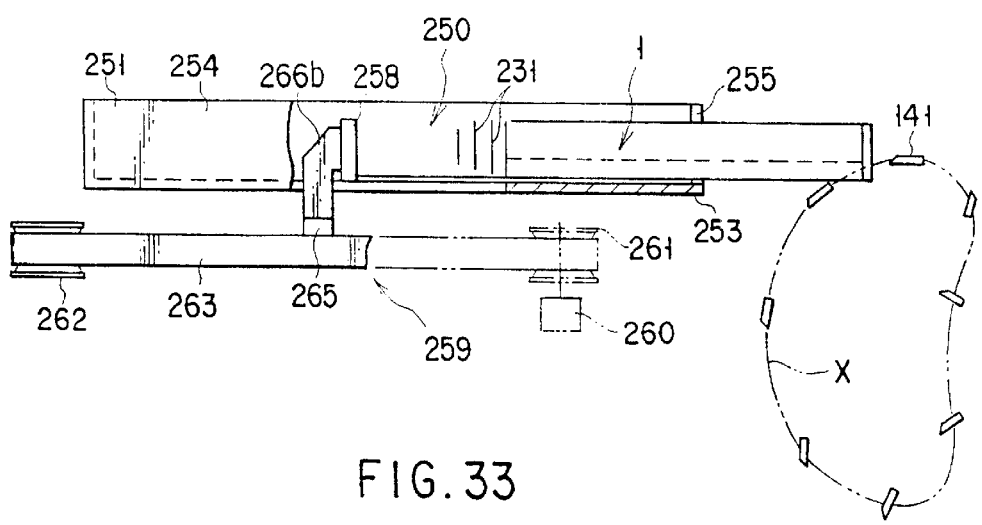
FIG. 33 is a side view of the planting device showing in partly broken manner a seedling-supporting base.

A planting device 250 shown in FIGS. 32 and 33 is used for planting the rice seedlings grown by the seedling-growing sheet 1 folded zigzag in the paddy field. The planting device 250 comprises a seedling table 251 on which the seedling-growing sheet 1 is disposed and a transfer mechanism 252 for transferring the seedling-growing sheet 1 from the seedling table 251.

The seedling table 251 comprises a rectangular bottom wall 253 on which the seedling-growing sheet 1 is disposed and a peripheral wall 254 standing upright from the periphery of the bottom wall 253. The seedling table 251 also comprises an open portion 255 through which the seedling-growing sheet 1 is taken out, and a pair of sheet stoppers 256a, 256b serving to determine the mounting position of the seedling-growing sheet 1. The open portion 255 is formed in the peripheral wall 254 and positioned in a front end portion of the seedling table 251. Further, the sheet stoppers 256a, 256b are positioned in a central portion in the front-rear direction of the seedling table 251. The folding piece 231 positioned in the front end of the seedling-growing sheet 1 is brought into contact with these sheet stoppers 256a, 256b.

A plate-like sheet pressing tool 258 is arranged on the bottom wall 253 of the seedling table 251. The sheet pressing tool 258 serves to push the seedling-growing sheet 1 toward the sheet stoppers 256a, 256b. The seedling-growing sheet 1 is housed between the sheet pressing tool 258 and the sheet stoppers 256a, 256b.

A driving mechanism 259 for moving the sheet pressing tool 258 toward or away from the sheet stoppers 256a, 256b is arranged sideward of the seedling table 251. The driving mechanism 259 comprises a primary pulley 261 driven by a motor 260, a secondary pulley 262 that can be rotated freely, and a driving belt 263 stretched between these pulleys 261 and 262. The pulleys 261, 262 are arranged apart from each other in the front-rear direction of the seedling table 251. Also, the rotary shafts of the pulleys 261, 262 are held upright. It follows that the driving belt 263 is run in the moving direction of the sheet pressing tool 258.

A bracket 265 extending toward the seedling table 251 is fixed to the driving belt 263. The bracket 265, which is positioned below the bottom wall 253 of the seedling table 251, is provided with a pair of holders 266a, 266b extending upward. These holders 266a, 266b extend through guide holes 267a, 267b formed in the bottom wall 253 so as to be joined to the sheet pressing tool 258. It follows that the sheet pressing tool 258 is moved toward or away from the sheet stoppers 256a, 256b by operating the motor 260 to run the driving belt 263.

The transfer mechanism 252 comprises a driving sprocket 270 and a tension roller 271. As in the first embodiment, the driving sprocket 270 is intermittently driven by the power transmitted from the PTO shaft 56. The driving sprocket 270 is in mesh with the engaging holes 7 of the seedling-growing sheet 1, with the result that the seedling-growing sheet 1 is intermittently transferred from the seedling table 251. The planting pieces 10 of the seedling-growing sheet 1 are planted by the planting claw 141 in the paddy field Z as in the first embodiment.

The tension roller 271 is urged by a spring 272 toward the driving sprocket 270, with the result that the seedling-growing sheet 1 is held stably between the tension roller 271 and the driving sprocket 270. Since the seedling-growing sheet is pushed against the driving sprocket 270 by the tension roller 271, the seedling-growing sheet 1 is engaged without fail with the driving sprocket 270.

The transfer mechanism 252 comprises a pair of guide rollers 275 serving to prevent the seedling-growing sheet 1 from falling down. These guide rollers 275 are arranged in the open portion 255 of the seedling table 251. It follows that the seedling-growing sheet 1 is guided through the clearance between the guide rollers 275 to reach the driving sprocket 270.

In the planting device 250 of the construction described above, the driving mechanism 259 is operated in accordance with movement of the seedling-growing sheet 1 so as to move the sheet pressing tool 258 toward the sheet stoppers 256a, 256b. As a result, the seedling-growing sheet 1 folded zigzag is held between the sheet stoppers 256a, 256b and the sheet pressing tool 258. Therefore, the seedling-growing sheet 1 on the seedling table 251 is prevented from falling down or from being deviated.

With progress in the delivery of the seedling-growing sheet 1, the sheet pressing tool 258 is moved toward the sheet stoppers 256a, 256b to form a vacant region in a rear portion of the seedling table 251. In this case, the sheet pressing tool 258 is moved away from the sheet stoppers 256a, 256b so as to be positioned in the rear end of the vacant region. As a result, the new seedling-growing sheet 1 folded zigzag can be replenished in the vacant region on the seedling table 251. Clearly, the seedling-growing sheet 1 can be replenished easily on the seedling table 251.

Figure 34:
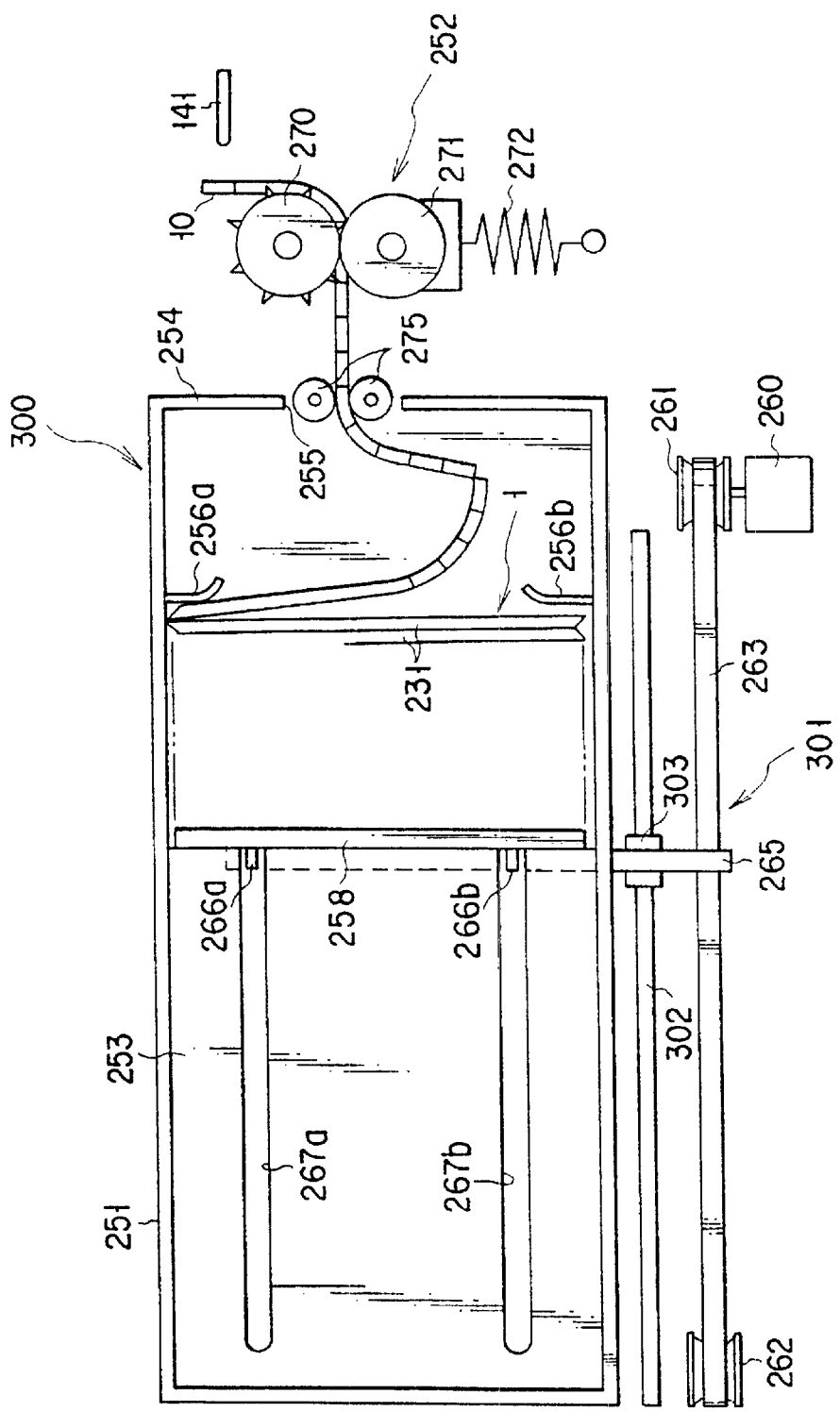
FIG. 34 is a plan view showing in a simplified fashion another planting device using the seedling-growing sheet shown in FIG. 31.

FIG. 34 shows a planting device 300 according to another embodiment of the present invention. The planting device 300 is equal in construction to the planting device 250 shown in FIGS. 32 and 33, except that a driving mechanism 301 for moving the sheet pressing tool 258 differs in construction from the driving mechanism 259 shown in FIGS. 32 and 33.

As shown in FIG. 34, the shafts of the primary pulley 261 and the secondary pulley 262 included in the driving mechanism 301 lie horizontal. Also, a guide shaft 302 is arranged between the driving belt 263 and the seedling table 251. A bearing portion 303 of the bracket 265 is slidably engaged with the guide shaft 302. As a result, the bracket 265 and the sheet pressing tool 258 are moved in the front-rear direction of the seedling table 251 along the guide shaft 302 in accordance with running of the driving belt 263.

The present invention is not limited to the embodiments described above and can be worked in variously modified fashions within the technical scope of the present invention.

For example, both the support member and the sheet body of the seedling-growing sheet need not be formed of a biodegradable material. It is possible to use a biodegradable material for forming any one of the support member and the sheet body.

In any of the embodiments described above, the receptacle of the seedling-growing sheet is elliptical. However, it is possible for the receptacle to be shaped circular, rectangular, polygonal or slit-like. Also, in each of the embodiments described above, engaging holes and transfer holes engaged with the transfer sprocket are formed in the seedling-growing sheet. However, it is also possible to form projections or recesses in the seedling-growing sheet in place of these holes.

Further, it is possible to wind the seedling-growing sheet into a sheet roll such that sheet body of the seedling-growing sheet faces inward when the seedlings are grown in the seedling-growing device and to prepare a sheet roll such that sheet body faces outward when the grown seedlings are planted in the paddy field. If the sheet roll is formed in this fashion, the rice seeds are prevented from falling from within the receptacles during the growth of the seedlings, and the presence of the seedling can be visually confirmed when the seedling is planted in the paddy field. If the presence of the seedling can be visually confirmed in the planting step of the seedling in the rice field, it is possible to prevent the lack of the seedling in a planting site of the paddy field, making it possible to plant the rice seedlings over the entire region of the paddy field without fail.

By contraries, it is possible to wind the seedling-growing sheet such that the sheet body faces outward during the seedling-growing step and that the sheet body faces inward when the grown seedlings are planted in the paddy field.

In each of the embodiments described above, a single rice seed is sown in each of the receptacles of the seedling-growing sheet. However, it is also possible to sow a plurality of rice seeds in each of the receptacles.

What should also be noted is that it is possible to form a plurality of receptacles in the planting piece that is to be cut away from the seedling-growing sheet. In this case, the cutting perforations need not be formed such that every receptacle is interposed between two adjacent cutting perforations. To be more specific, it is possible to form the cutting perforations such that a plurality of receptacles are interposed between two adjacent cutting perforations.

INDUSTRIAL APPLICABILITY

As described above in detail, the present invention provides a seedling-growing sheet. In the present invention, planting pieces can be cut away one by one from the seedling-growing sheet along cutting perforations without fail. Thus, the planting piece is prevented from being partially broken. Also, a plurality of planting pieces are prevented from being cut away together from the seedling-growing sheet. It follows that the seedlings held by the planting pieces can be planted continuously in the field.

It should also be noted that a large amount of seedlings can be grown in a single seedling-growing sheet, making mass production of seedlings possible. In addition, the seedling-growing sheet can be sent forth easily in the longitudinal direction, making it possible to avoid troubles taking place when the seedlings are sent forth. It follows that the seedling-planting work can be markedly simplified.

What is claimed is:

1. A seedling-growing sheet comprising:
   a laminate body including an elongated support member and an elongated porous sheet body laminated on the support member;
   a number of receptacles for housing seeds and seedlings grown from the seeds, the receptacles being formed in the sheet body of the laminate body and arranged apart from each other in a longitudinal direction of the sheet body; and
   a series of cutting perforations for use in cutting out planting pieces each including at least one receptacle from the laminate body, each planting piece being defined between associated adjacent two of the series of cutting perforations, each of the cutting perforations extending in a width direction of the laminate body, the series of cutting perforations being arranged in a longitudinal direction thereof,
   wherein the series of cutting perforations penetrate both the support member and the sheet body, and the support member includes a plurality of first cutting areas defined by associated two of the series of cutting perforations, the sheet body includes a plurality of second cutting areas each defined by associated adjacent two of the series of cutting perforations, and the first cutting areas and the second cutting areas are put together to constitute the planting pieces.

2. The seedling-growing sheet according to claim 1, wherein at least one of said support member and said sheet body is formed of a biodegradable material.

3. The seedling-growing sheet according to claim 1, wherein said laminate body is wound into a roll.

4. The seedling-growing sheet according to claim 1, wherein said laminate body is folded in a zigzag manner.

5. The seedling-growing sheet according to claim 1, wherein said laminate body has an upper edge extending in a longitudinal direction of the laminate body, and said receptacles are formed in an upper portion, which is contiguous to said upper edge of the laminate body.

6. The seedling-growing sheet according to claim 5, wherein said receptacles (6) consist of a recess open to a side opposite to said support member, said recess being shaped to define a posture of a seed housed therein such that the seed is held upright or lies down.

7. The seedling-growing sheet according to claim 6, wherein said laminate body is wound into a roll such that the sheet body faces outward.

8. The seedling-growing sheet according to claim 6, wherein said laminate body is wound into a roll such that the sheet body faces inward.

9. The seedling-growing sheet according to claim 1, wherein each cutting perforation is constituted by cut lines which penetrate both the support member and the porous sheet body, and which are arranged in the width direction of the laminate body.

10. A method of manufacturing a seedling-growing sheet comprising:
   forming a block consisting of a porous material;
   slicing said block to form an elongated sheet body;
   forming a laminate body by laminating said sheet body on an elongated support member; and
   forming a number of receptacles for housing seeds in the sheet body of the laminate body a predetermined distance apart from each other in a longitudinal direction of the laminate body and a series of cutting perforations, each of the series of cutting perforations extending across a width of the laminate body, the series of cutting perforations being arranged a predetermined distance apart from each other in a longitudinal direction of the laminate body in such a way as to define planting pieces each including at least one receptacle, said each planting piece being provided between associated adjacent two of the series of cutting perforations,
   wherein when stamping is performed on the laminate body, the series of cutting perforations are formed in such a way as to penetrate both the support member and the porous sheet body, so that a plurality of first cutting areas are provided in the support member, a plurality of second cutting areas are provided in the porous sheet body, and the first cutting areas and the second cutting areas are put together to constitute the planting pieces, respectively, each of the first cutting areas and each of the second cutting areas being defined by associated adjacent two of the series of cutting perforations.

* * * * *